United States Patent
Ohnishi et al.

[11] Patent Number: 5,561,532
[45] Date of Patent: Oct. 1, 1996

[54] IMAGE REPRODUCING APPARATUS

[75] Inventors: Shinji Ohnishi, Yokohama; Makoto Shimokoriyama; Hidenori Hoshi, both of Kawasaki; Izumi Matsui; Akiyoshi Hamanaka, both of Tokyo, all of Japan

[73] Assignee: Canon Kabushiki Kaisha, Tokyo, Japan

[21] Appl. No.: 220,054

[22] Filed: Mar. 30, 1994

[30] Foreign Application Priority Data

Mar. 31, 1993 [JP] Japan ................................. 5-096860
Apr. 15, 1993 [JP] Japan ................................. 5-088662
Jun. 24, 1993 [JP] Japan ................................. 5-153634

[51] Int. Cl.$^6$ ................................................. H04N 5/945
[52] U.S. Cl. ............................ 386/47; 348/607; 348/616; 386/111
[58] Field of Search ........................... 358/336; 348/607, 348/616; H04N 5/945

[56] References Cited

U.S. PATENT DOCUMENTS 5,247,363  9/1993  Sun ......................................... 358/336
5,353,059  10/1994  Lawlor .................................... 348/607

Primary Examiner—Howard W. Britton
Attorney, Agent, or Firm—Fitzpatrick, Cella, Harper & Scinto

[57] ABSTRACT

An apparatus includes a reproducing circuit for reproducing an encoded image signal from a recording medium, a decoding circuit for decoding the image signal reproduced by the reproducing circuit, a movement detection circuit for detecting a movement of an image signal which cannot be detected by the decoding circuit, and outputting a signal indicating the movement level of the undecodable signal, and a construction circuit for constructing an image signal with respect to the undecodable image signal on the basis of the output from the movement detection means. Even when an undecodable image signal is an intermediate signal between signals with and without a movement, a good reproduced image is obtained.

17 Claims, 24 Drawing Sheets

| ACTIVITY CLASS | 0 | 1 | 2 | 3 |
|---|---|---|---|---|
| Nh | 0 | ≧1 | ≧5 | ≧10 |
| Nf | 0 | 0 | 0 | ≧1 |

FIG. 13

| MOVEMENT ESTIMATION RESULT / FREQUENCY INFORMATION | THERE IS MOVEMENT | THERE IS NO MOVEMENT |
|---|---|---|
| MANY HIGH FREQUENCIES | INTERFRAME INTERPOLATION | INTERFRAME INTERPOLATION |
| LESS HIGH FREQUENCIES | INTRAFIELD INTERPOLATION | INTERFRAME INTERPOLATION |

IMAGE REPRODUCING APPARATUS

BACKGROUND OF THE INVENTION

1. Field of the Invention

The present invention relates to an image reproducing apparatus and, more particularly, to an image reproducing apparatus for concealing error uncorrectable data of a video signal which is encoded with high efficiency, and reproducing the obtained data.

2. Related Background Art

As a conventional apparatus of this type, a digital VTR for converting a video signal into a digital signal, and recording/reproducing the digital signal is known. In recent years, of such digital VTRs, one which records/reproduces a digital image signal after compression and encoding has been proposed.

As a technique for compressing and encoding an image signal with high efficiency, an orthogonal transform encoding system is known. In this technique, an image signal is divided into blocks each including a plurality of pixels, and each image signal block is subjected to orthogonal transform such as discrete cosine transform. Thereafter, the transformed coefficients are quantized and entropy-encoded.

In a digital VTR which compresses and records an image using this orthogonal transform encoding system, an image signal is encoded and recorded in units of blocks. In a reproduction mode, especially in a special reproduction mode such as a search reproduction mode, recorded image data cannot be normally reproduced. When an error is generated in encoded data, a code error is generated in units of blocks. Since variable length codes are popularly used, a decoding error propagates over a plurality of blocks, resulting in large deterioration of an image.

When image data of a block (to be referred to as an error block hereinafter) which includes undecodable data (to be referred to as error data hereinafter) are interpolated, normally, interframe interpolation and intrafield interpolation are selectively used. More specifically, an interframe correlation (an intrablock sum of difference absolute values between pixels in the current frame and those in the immediately preceding frame) of image data of each of the upper and lower blocks of the error block is calculated to estimate the presence/absence of a movement in the error block. If the presence of a movement is detected, intrafield interpolation is performed; otherwise, interframe interpolation is performed.

However, when such a method is applied to a case wherein the error block corresponds to a high-definition image and includes a movement, intrafield interpolation is selected regardless of whether image data around the error block correspond to a high-definition image. In this case, the intrafield interpolation can provide a strong temporal correlation but weakens a spatial correlation. As a result, the resolution of the interpolated block is lowered, and a low-resolution block is included in a high-definition image, resulting in an unbalanced image.

SUMMARY OF THE INVENTION

It is an object of the present invention to solve the above-mentioned problems.

It is another object of the present invention to provide an image reproducing apparatus which can prevent deterioration of image quality of a reproduced image even when an image of an error block corresponds to an intermediate image between those with and without movement.

In order to achieve the above objects, according to an aspect of the present invention, there is provided an image reproducing apparatus comprising:

(a) reproducing means for reproducing an encoded image signal from a recording medium;

(b) decoding means for decoding the image signal reproduced by the reproducing means;

(c) movement detection means for detecting a movement of an image signal which cannot be decoded by the decoding means, the movement detection means outputting a signal indicating a movement level of the undecodable signal, and the signal indicating the movement level being able to assume at least three values; and (d) construction means for constructing an image signal with respect to the undecodable image signal on the basis of an output from the movement detection means.

It is still another object of the present invention to provide an image reproducing apparatus which can obtain a good reproduced image using frequency information of an error block.

In order to achieve the above object, according to another aspect of the present invention, there is provided an image reproducing apparatus comprising:

(a) reproducing means for reproducing a block-encoded image signal from a recording medium;

(b) decoding means for decoding the image signal;

(c) movement detection means for detecting a movement of a block including an image signal which cannot be decoded by the decoding means;

(d) frequency information detection means for detecting frequency information of the block including the undecodable image signal, the frequency information indicating a high-frequency information of the block; and (e) construction means for varying processing on the basis of an output from the movement detection means and an output from the frequency information detection means, and constructing an image signal with respect to image signals of a block including the undecodable image signal.

The above and other objects and features of the present invention will become apparent from the following detailed description of the present invention taken in conjunction with the accompanying drawings.

BRIEF DESCRIPTION OF THE DRAWINGS

FIG. 13 is a view for explaining the operation of an interpolation means discrimination circuit in FIG. 7;

DETAILED DESCRIPTION OF THE PREFERRED EMBODIMENTS

The preferred embodiments of the present invention will be described in detail hereinafter with reference to the accompanying drawings.

The flow of data in an image signal reproducing apparatus including an embodiment of the present invention will be described below with reference to FIG. 1.

Figure 1:
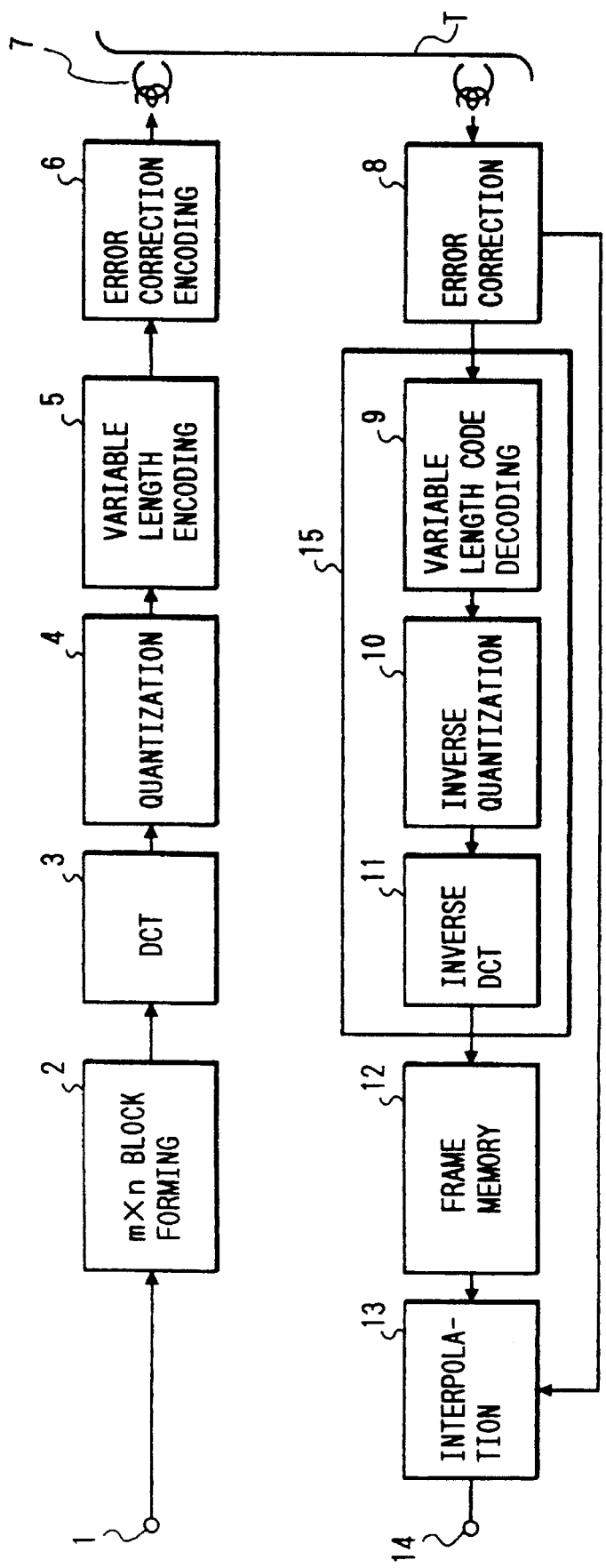
FIG. 1 is a block diagram showing the arrangement of a digital VTR according to an embodiment of the present invention.

FIG. 1 is a block diagram showing the arrangement of a digital VTR according to an embodiment of the present invention. Referring to FIG. 1, digital image data is input from an input terminal 1, and is divided into blocks each including 8×8 pixels in units of frames by a block forming circuit 2. Each image data block is subjected to orthogonal transform by a DCT circuit 3 to be transformed from data in a spatial region into data in a frequency region.

The image data transformed to data in the frequency region is quantized by a quantization circuit 4, and is encoded by a variable length encoding circuit 5, thus obtaining a desired data transfer rate. The encoded data is subjected to error correction encoding by an error correction encoding circuit 6, and the encoded data is recorded on a magnetic tape T by a recording/reproducing circuit 7.

In a reproduction mode, data reproduced by the recording/reproducing circuit 7 is supplied to an error correction circuit 8, and is subjected to code error correction. Thereafter, the corrected data is decoded by a variable length code decoding circuit 9. The decoded data is inversely quantized by an inverse quantization circuit 10, and is then subjected to inverse DCT by an inverse DCT circuit 11 to be transformed from data in the frequency region to data in the spatial region. The transformed data is written in a frame memory 12. Note that the variable length code decoding circuit 9, the inverse quantization circuit 10, and the inverse DCT circuit 11 constitute a decoding circuit 15. The data written in the frame memory 12 is read out in synchronism with raster scanning of, e.g., a monitor, and error data of the readout data is interpolated by an interpolation circuit 13. Thereafter, the data is output from an output terminal 14, and is displayed on the monitor.

Figure 2:
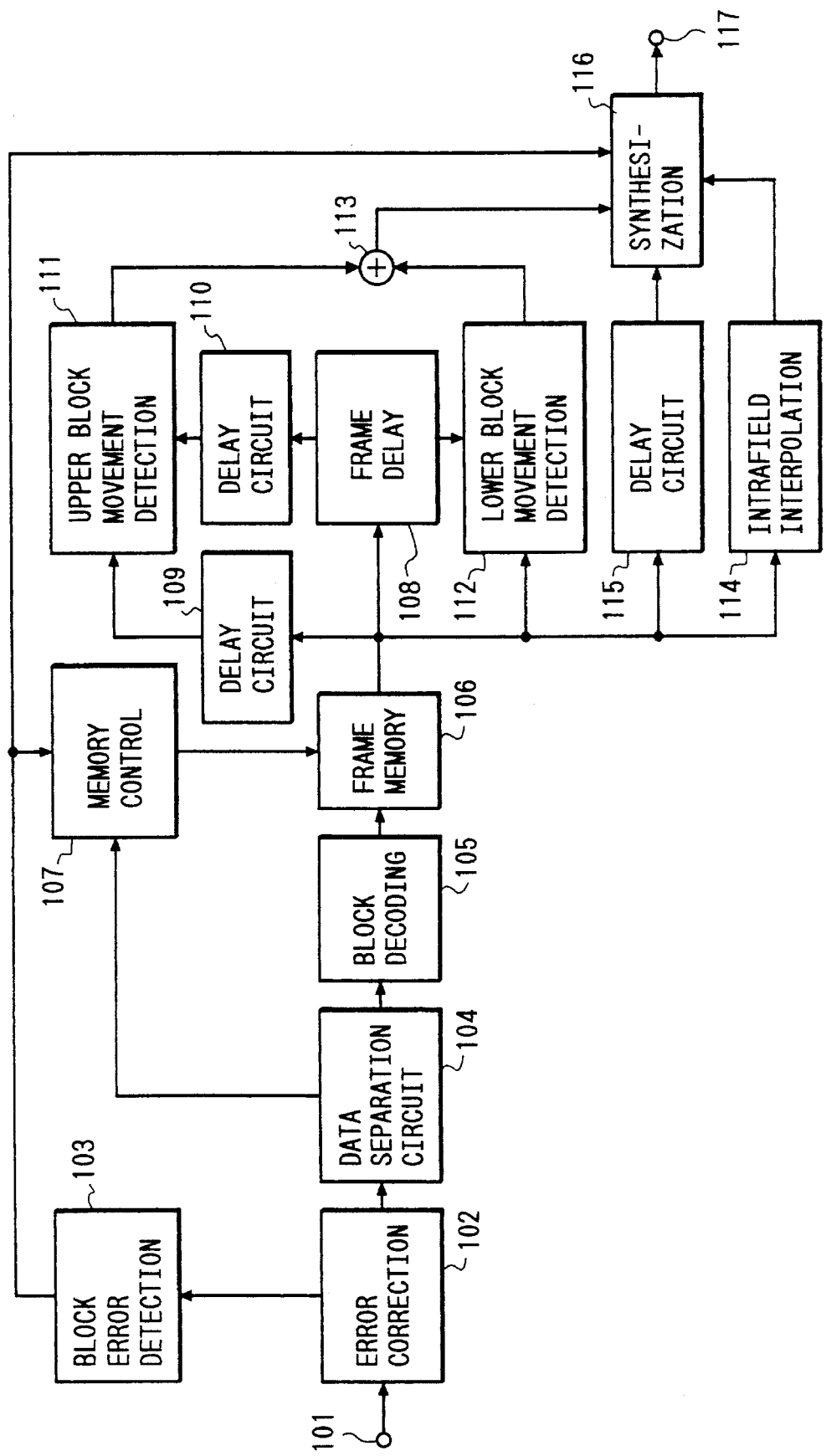
FIG. 2 is a block diagram showing the arrangement of a reproducing system of the digital VTR according to the embodiment of the present invention.

The first embodiment of the present invention will be described below. FIG. 2 is a block diagram showing the arrangement of a reproducing system of a digital VTR according to the first embodiment of the present invention. Referring to FIG. 2, the reproducing system includes an input terminal 101 for receiving an image supplied from the recording/reproducing circuit 7 in FIG. 1, an error correction circuit 102 for reproduced image data, a block error detection circuit 103 for generating an error flag in units of blocks, a data separation circuit 104 for separating a block address and image data from reproduced image data, and a block decoding circuit 105 for decoding reproduced image data to original image data. The block decoding circuit 105 is constituted by the variable length code decoding circuit 9, the inverse quantization circuit 10, and the inverse DCT circuit 11 shown in FIG. 1. The reproducing system also includes a frame memory 106 for storing image data, and a memory control circuit 107 for controlling read/write accesses to the frame memory 106 in accordance with the separated block address.

The reproducing system further includes a frame delay circuit 108 for delaying the output from the frame memory 106 by one frame, a delay circuit 110 for delaying input image data by a required time period, movement detection circuits 111 and 112 for respectively detecting movements of the upper and lower blocks of an error block, an adder 113 for adding the outputs from the movement detection circuits 111 and 112, an intrafield interpolation circuit 114 for generating intrafield interpolated data, a delay circuit 115 for delaying image data from the frame memory 106, a synthesization circuit 116 for synthesizing interpolated data, i.e., interframe interpolated data and intrafield interpolated data, and an output terminal 117 for image data.

The operation will be described below.

A reproduced image signal from the magnetic tape T is supplied to the error correction circuit 102 via the input terminal 101, and is subjected to code error correction. The corrected signal is supplied to the data separation circuit 104. The block error detection circuit 103 generates a block error flag indicating if a corresponding block is decodable, on the basis of an error flag from the error correction circuit 102.

The data separation circuit 104 receives the data from the error correction circuit 102, and supplies block address data indicating the position, on the screen, of a corresponding block to the memory control circuit 107 and image data to the block decoding circuit 105. The block decoding circuit 105 decodes image data in units of blocks, as described above, and outputs the decoded image data to the frame memory 106. The memory control circuit 107 determines the writing address of decoded image data of a corresponding block on the basis of the block address data from the data separation circuit 104, and determines based on the block error flag output from the block error detection circuit 103 whether or not the decoded image data of the corresponding block is to be written in the frame memory 106. If it is determined based on the error flag that data is not to be written in the frame memory 106, image data of the previous frame is left stored in the frame memory. An image of each frame is read out from the frame memory 106 in units of blocks in the raster scanning order.

Figure 3:
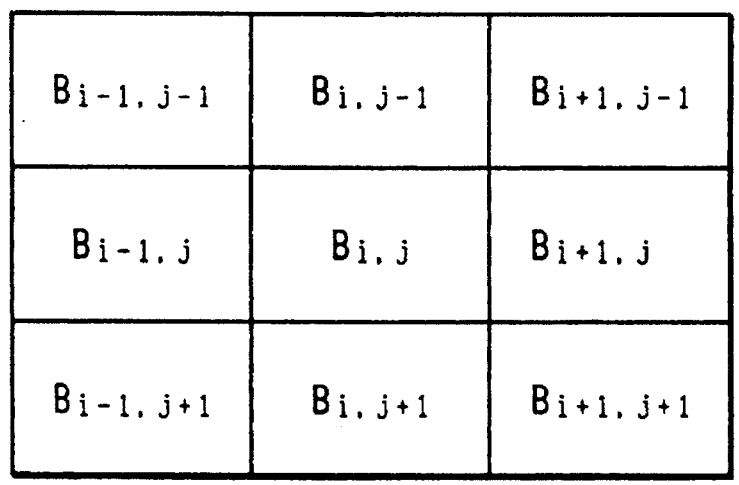
FIG. 3 is a view for explaining an interpolation operation in the apparatus shown in FIG. 2.

FIG. 3 is a view for explaining the operation of the interpolation circuit shown in FIG. 2. Referring to FIG. 3, each square represents one pixel block, and the arrangement of squares in FIG. 3 corresponds to that on the screen. A block $B_{i,j}$ is an error block, and the movement amount of the block $B_{i,j}$ is determined by detecting the movements of upper and lower blocks $B_{i,j-1}$ and $B_{i,j+1}$. In the following description, assume that the frame memory 106 is outputting image data of the lower block $B_{i,j+1}$. At this time, the frame delay circuit 108 is outputting image of the same block $B_{i,j+1}$ one frame before. The delay time of the delay circuit 109 is set to output image data of the upper block $B_{i,j-1}$. The delay time of the delay circuit 110 is equal to that of the delay circuit 109, and is set to output image data of the same block $B_{i,j-1}$ one frame before with respect to the output from the delay circuit 109.

The upper block movement detection circuit 111 calculates the absolute values of differences between pixel data in the block $B_{i,j-1}$ output from the delay circuit 109 and pixel data of the same block $B_{i,j-1}$ one frame before which is output from the delay circuit 110, and totals the absolute values in units of blocks. The movement detection circuit 111 compares the total value with a predetermined threshold value, and generates three output values corresponding to movement states, as shown in Table 1 below.

TABLE 1

|  | Output Value | Movement State |
| --- | --- | --- |
| sum < Th1 | 0 | No Movement |
| Th1 ≦ sum < Th2 | 0.25 | Small Movement |
| Th2 ≦ sum | 0.5 | Large Movement |

Threshold values: Th1, Th2 (Th1 < Th2)
Total of difference absolute values of intrablock pixel data: sum This data is used as movement data of the upper block. The lower block movement detection circuit 112 calculates differences between pixel data in the block $B_{i,j+1}$ output from the frame memory 106 and pixel data in the same block $B_{i,j+1}$ one frame before which is output from the frame delay circuit 108, and outputs three movement data values of the lower block shown in Table 1 in the same manner as in the upper block movement detection circuit 111.

The movement data from the upper and lower block movement detection circuits 111 and 112 are added to each other by the adder 113, and the sum data is used as movement data of the error block. The output value from the adder 113 can assume five values, as shown in Table 2 below, and indicates the movement amount of the error block $B_{i,j+1}$ estimated from the three movement data values of the upper and lower blocks. In Table 2, the movement amount becomes larger toward the right side.

TABLE 2

| Output Value | 0 | 0.25 | 0.5 | 0.75 | 1 |
| --- | --- | --- | --- | --- | --- |
| State | still | → |  |  | Move |

On the other hand, the intrafield interpolation circuit 114 outputs image data for intrafield interpolating the block $Bi_{,j}$ using image data output from the frame memory 106.

The intrafield interpolation circuit 114 will be described below with reference to FIG. 4.

Figure 4:
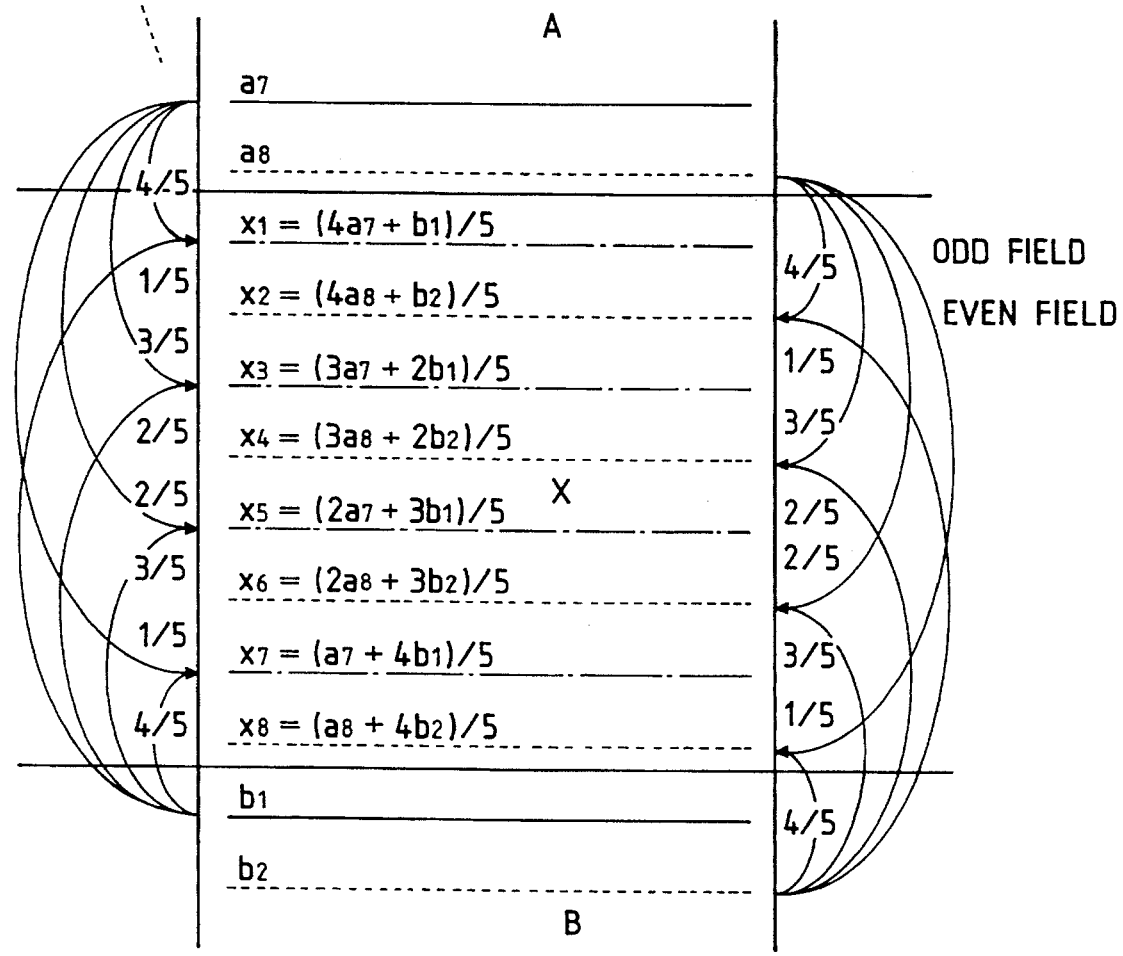
FIG. 4 is a view for explaining intrafield interpolation.

Assume that a block X in FIG. 4 is an error block. As described above, in this embodiment, processing is executed in units of fields. For this reason, odd field lines x1, x3, x5, and x7 of the error block X are subjected to intrafield linear interpolation by a line a7 in a block A, which line is the line in the same field closest to the uppermost line x1 in the odd field, and a line b1 in a block B, which line is the line in the same field closest to the lowermost line x7, of lines in normally decoded blocks. More specifically, as shown in FIG. 4, in the odd fields, x1=(4×a7+b1)/5, x3=(3×a7+2×b1)/5, x5=(2×a7+3×b1)/5, and x7=(a7+4×b1)/5.

Upon completion of the interpolation processing of the odd fields, processing for even fields is similarly performed. In the even fields, lines x2, x4, x6, and x8 are interpolated using a line a8 in the block A and a line b2 in the block B. In this manner, intrafield interpolation is performed.

The delay time of the delay circuit 115 is set to output the block $B_{i,j}$ while the frame memory 106 is outputting the image data of the block $B_{i,j+1}$. When the block $B_{i,j}$ is decodable, the delay circuit 115 outputs its image data; when the block $B_{i,j}$ is undecodable, the delay circuit 115 outputs image data of the block $B_{i,j}$ in the previous frame, which data is left stored in the frame memory 106. Therefore, interframe interpolated image data is output.

The synthesization circuit 116 checks the error flag from the block error detection circuit 103. When it is determined that the block $B_{i,j}$ is decodable, the synthesization circuit 116 directly outputs the input data from the delay circuit 115 to the output terminal 117. However, when it is determined that the block $B_{i,j}$ is undecodable, the synthesization circuit 116 synthesizes a value obtained by multiplying the output signal from the intrafield interpolation circuit 114 with the output value representing the movement amount from the adder 113 and adding that product to a value obtained by multiplying the input signal from the delay circuit 115 with (1−the output from the adder 113), and outputs the synthesized value to the output terminal 117.

Figure 5:
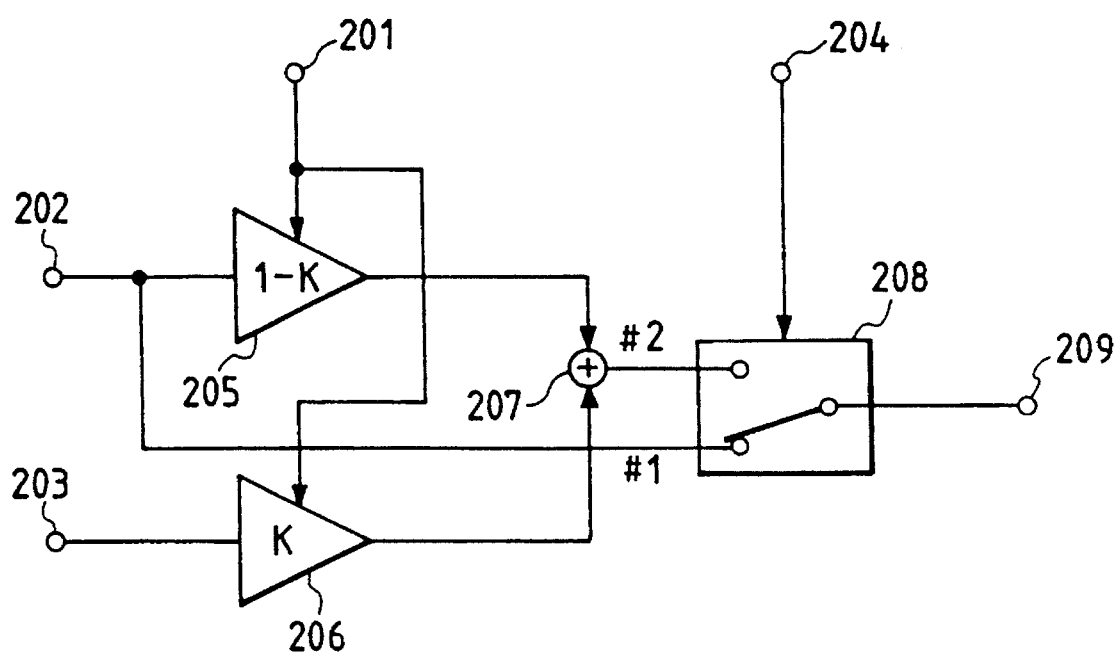
FIG. 5 is a block diagram showing the arrangement of a synthesization circuit shown in FIG. 2.

FIG. 5 shows the arrangement of the synthesization circuit 116. Referring to FIG. 5, the synthesization circuit 116 comprises an input terminal 201 for receiving movement data (K: 0≦K ≦1) from the adder 113, an input terminal 202 for receiving normally decoded image data from the delay circuit 115 or interframe interpolated image data (in FIG. 5, the interframe interpolated image data is assumed to be input for the sake of description), an input terminal 203 for receiving intrafield interpolated image data form the intrafield interpolation circuit 114, an input terminal 204 for receiving the block error flag from the block error detection circuit 103, coefficient multipliers 205 and 206, an adder 207 for adding interpolated image data, a switch 208 for switching output image data, and an output terminal 209.

The operation will be described below.

Movement data K of the interpolated block input to the input terminal 201 is supplied to the coefficient multipliers

205 and 206. The coefficient multiplier 205 outputs image data obtained by multiplying the interframe interpolated image data input from the input terminal 202 with (1−K), and the coefficient multiplier 206 outputs image data obtained by multiplying the intrafield interpolated image data input from the input terminal 203 with K. The adder 207 adds the weighted interpolated image data from the coefficient multipliers 205 and 206 to generate image data to be actually used in interpolation.

For example, assuming that movement data K=0.25 (small movement) is input to the input terminal 201, the output from the coefficient multiplier 205=interframe interpolated image data×0.75 and the output from the coefficient multiplier 206=intrafield interpolated image data×0.25. Then, the adder 207 synthesizes these interpolated data at a ratio of interframe interpolation: intrafield interpolation=3:1.

The switch 208 switches output image data in accordance with the block error flag input from the input terminal 204. More specifically, upon checking of the block error flag, if the corresponding block is a decodable block, since data from the delay circuit 115 and input at the input terminal 202 is normally decoded image data, the switch 208 is connected to the #1 side, and the decoded image data is output to the output terminal 209. If the corresponding block is an error block, the switch 208 is connected to the #2 side, and interpolated image data is output to the output terminal 209.

In this manner, when movement data of the upper and lower blocks are represented by multiple values, the results of the two different interpolation methods can be synthesized while changing the synthesizing ratio like interframe interpolation: intrafield interpolation=1:0, 3:1, 1:1, 1:3, and 0:1, and adaptive interpolation corresponding to the movement amount can be performed, thus improving image quality.

In the above embodiment, the output value of each of the upper and lower block movement detection circuits 111 and 112 is represented by three values, and the movement amount of the pixel block to be interpolated is represented by five values. However, these data may assume more values. The synthesization method in the synthesization circuit 116 is not limited to that in this embodiment, and may adopt synthesization using more interpolation methods, synthesization based on movement detection results of surrounding blocks including, e.g., right and left blocks in addition to the upper and lower blocks, and the like.

The second embodiment of the present invention will be described below.

Figure 6:
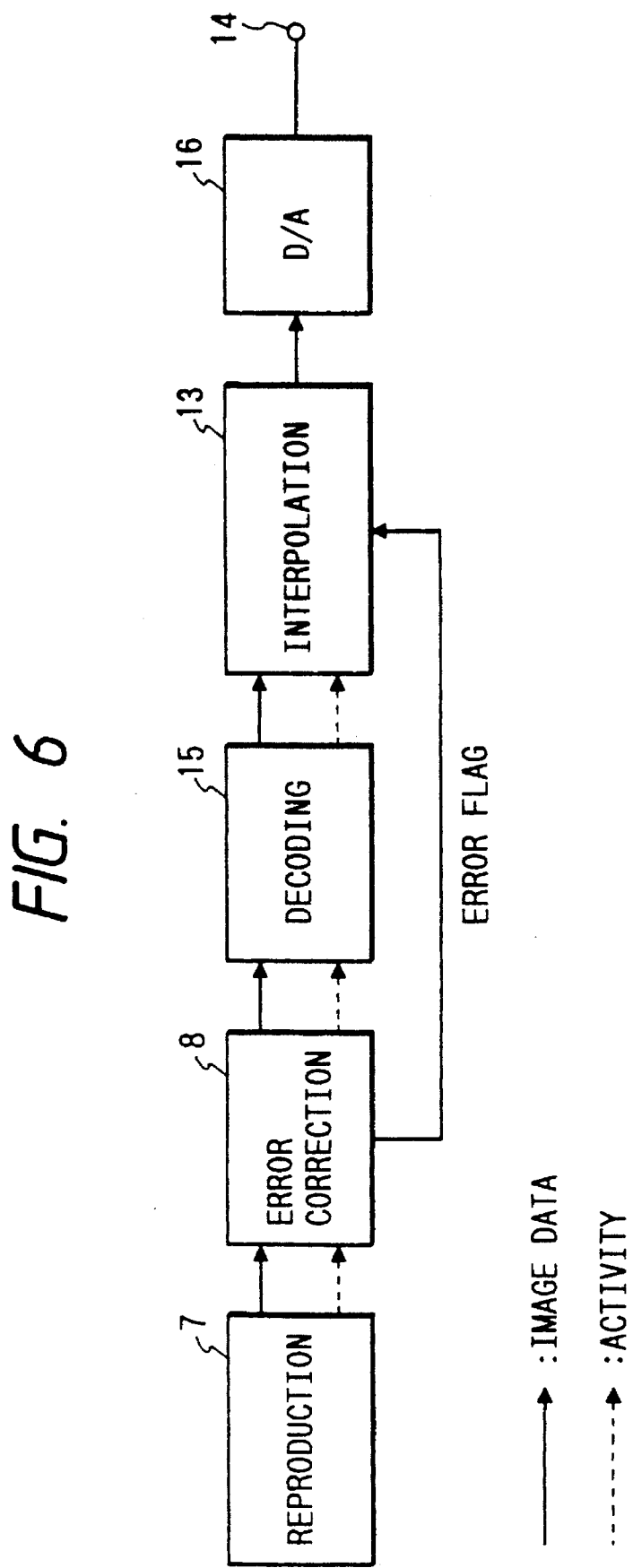
FIG. 6 is a block diagram showing another arrangement of the reproducing system of the digital VTR according to the embodiment of the present invention.

The flow of data in a reproducing system of a digital VTR according to this embodiment will be described below with reference to FIG. 6. FIG. 6 is a block diagram showing the arrangement of the reproducing system of the digital VTR including the second embodiment, and the same reference numerals in FIG. 6 denote the same parts as in FIG. 1o Referring to FIG. 6, image data which is compressed and recorded, as described above, is reproduced by a reproduction circuit 7. The reproduced image data is subjected to code error correction by an error correction circuit 8. The circuit 8 outputs an error flag for uncorrectable data. The image data subjected to code error correction is decoded into an original block consisting of 8×8 pixels by a decoding circuit 15, and the decoded data is output to an interpolation circuit 13. Error data is subjected to adaptive interpolation by an interpolation circuit 13, as described above. The interpolated image data or normally reproduced image data is converted into an analog signal by a D/A converter 16, and the analog signal is output from an output terminal 14.

Activity data is calculated by a method to be described later using DCT coefficients upon execution of DCT of image data blocks, thus determining its class. The activity data is recorded and reproduced together with image data, and is output to the interpolation circuit 13.

From data which cannot be corrected by the error correction circuit 8, an image is omitted in units of blocks. The error flag is a signal indicating such an error uncorrectable block, and is output to the interpolation circuit 13 in units of error blocks.

Figure 7:
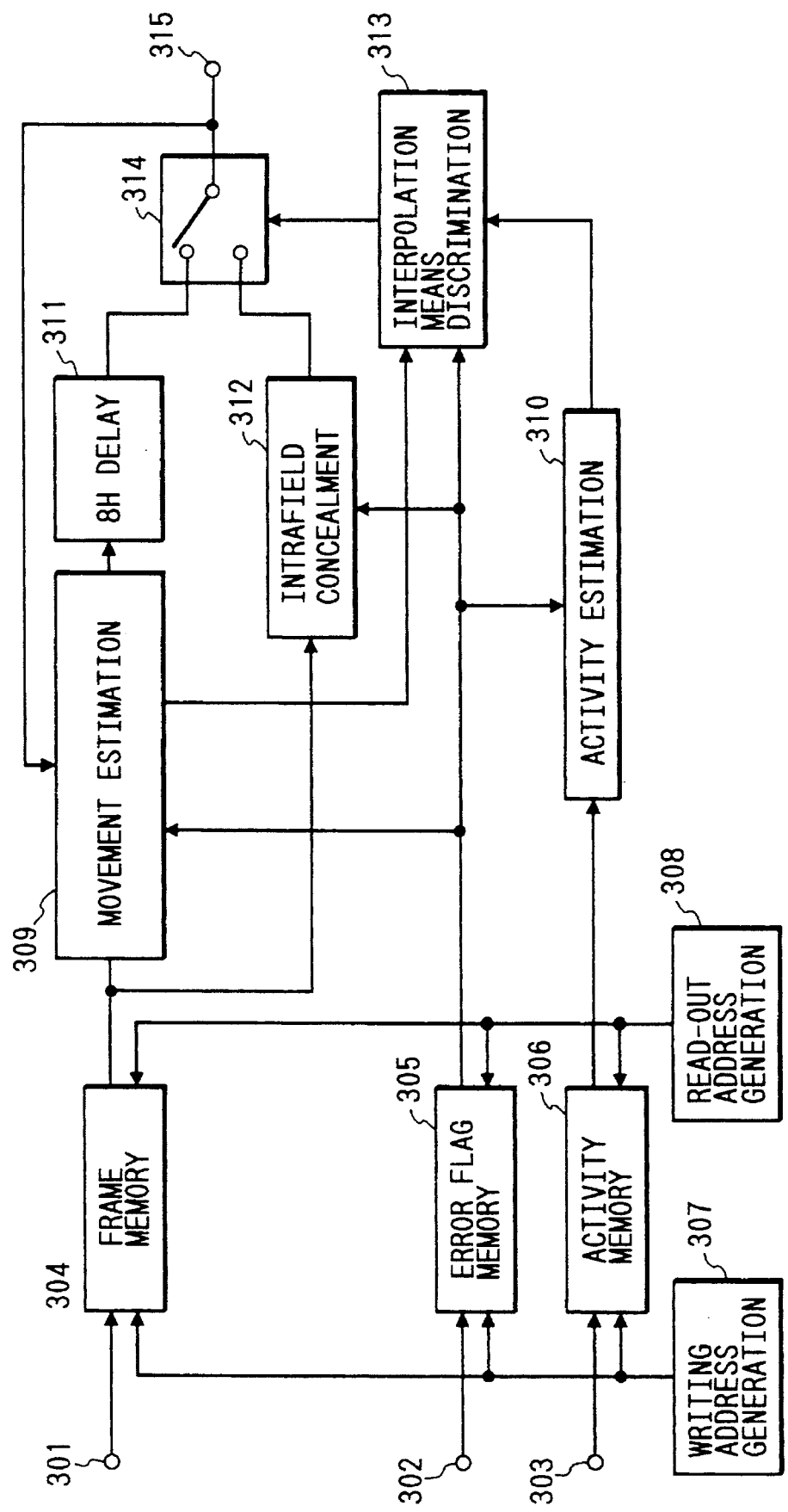
FIG. 7 is a block diagram showing the arrangement of an interpolation circuit shown in FIG. 6.

The interpolation circuit 13 shown in FIG. 6 will be described below. FIG. 7 is a block diagram showing the arrangement of the interpolation circuit 13. Referring to FIG. 7, an image signal from the decoding circuit 15 is input from an input terminal 301 in the order of normal interlace scanning, and is temporarily written in a frame memory 304 so as to change the read-out order of frames and fields.

In synchronism with this input data, an error flag is input from an error flag input terminal 302, and activity data is input from an activity input terminal 303. The error flag and the activity data are respectively written in an error flag memory 305 and an activity memory 306. In this case, the image data, the error flag, and the activity data are written at an address designated by a writing address generation circuit 307.

In a read-out mode, the above-mentioned data are read out from the read-out address designated by a read-out address generation circuit 308. In this case, image data is read out in units of fields. More specifically, of written data for one frame, data for the former field is read out first, and then, data for the latter field is read out. As a result, readout data corresponds to a block consisting of 8 pixels×4 pixels (lines). In the subsequent processing, 8 (horizontal)×4 (vertical) pixels are used as a processing block unit in units of fields.

The image data read out from the frame memory 304 is supplied to a movement estimation circuit 309 to estimate the movement of the error block on the basis of movement information of upper and lower blocks adjacent to the error block, and to interframe interpolate data in the error block.

Figure 8:
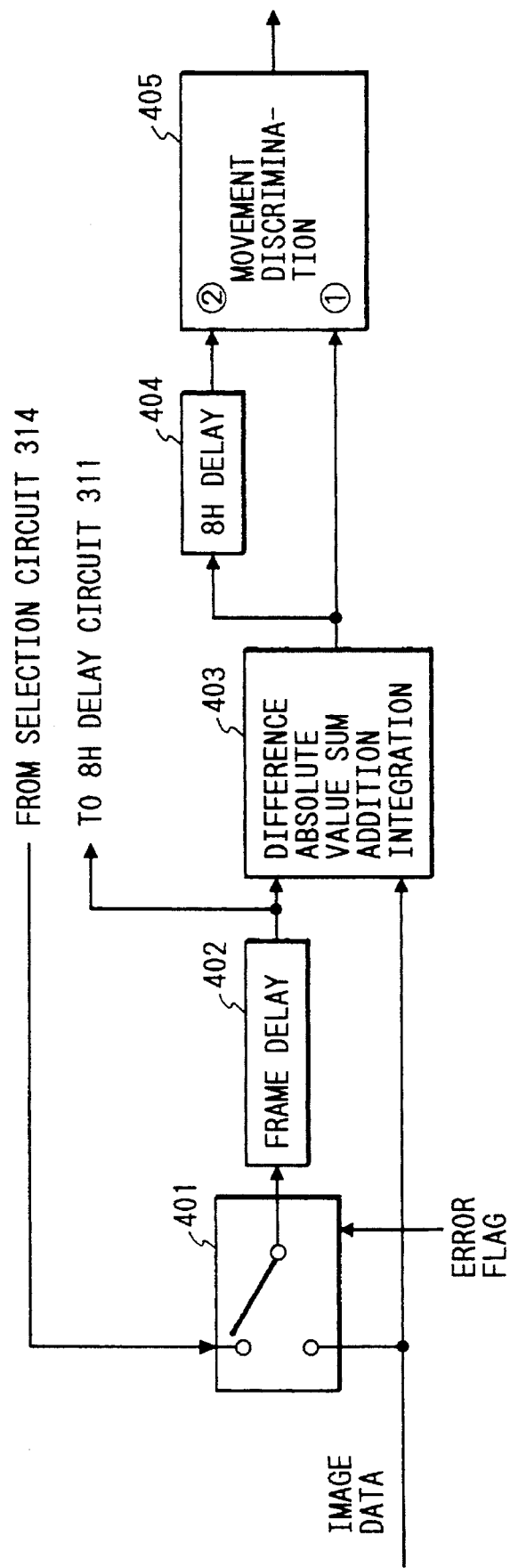
FIG. 8 is a block diagram showing a movement estimation circuit shown in FIG. 7.

The operation of the movement estimation circuit 309 will be described below with reference to FIG. 8. Image data from the frame memory 304 is supplied to a switch circuit 401. The switch circuit 401 also receives concealed image data or the output from a selection circuit 314 as normally reproduced image data. When normally reproduced data is input, the switch circuit 401 selects the output from the frame memory 304. When error data is input, the switch circuit 401 selects the output data from the selection circuit 314 (to be described later), thus realizing interframe interpolation.

Subsequently, processing of blocks as movement detection blocks around the error block, and the movement estimation operation of the error block based on this processing will be described below.

The movement detection block processing will be described below. Decodable data or concealed data output from the switch circuit 401 is supplied to a frame delay circuit 402, and is delayed by one frame. The output from the frame delay circuit 402 is supplied to a difference absolute value sum addition integration circuit 403 and an 8H delay circuit 311 in FIG. 7. The difference absolute value sum addition integration circuit 403 also receives data from the frame memory 304, and adds and integrates the difference absolute value sum between the current data and corresponding pixel data one frame before. The circuit 403 outputs the sum to a movement discrimination circuit 405 and an 8H delay circuit 404. The 8H delay circuit 404 delays the output from the difference absolute value sum addition integration circuit 403 by 8H corresponding to two blocks. The movement discrimination circuit 405 receives the output from the 8H delay circuit 404 and the output from the difference absolute value sum addition integration circuit 403, and adds these outputs. The circuit 405 then compares the sum with a predetermined threshold value. If the sum is larger than the threshold value, the circuit 405 discriminates the presence of movement; otherwise, it discriminates the absence of movement. The circuit 405 outputs the discrimination result to an interpolation means discrimination circuit 313.

The correspondence among the output (an output $\hat{2}$) from the 8H delay circuit 404, the output (an output $\hat{1}$) from the difference absolute value sum addition integration circuit 403, and input data will be examined below. The output $\hat{1}$ is the difference absolute value sum of an input data block and a data block one frame before. The output $\hat{2}$ is the difference absolute value sum of data in a block two blocks (eight lines) above the input data block in the same field, and data of a corresponding data block one frame before. More specifically, the movement discrimination circuit 405 simultaneously receives the difference absolute value sums of the current block and the block two blocks above in units of 8×4 pixels.

Figure 9:
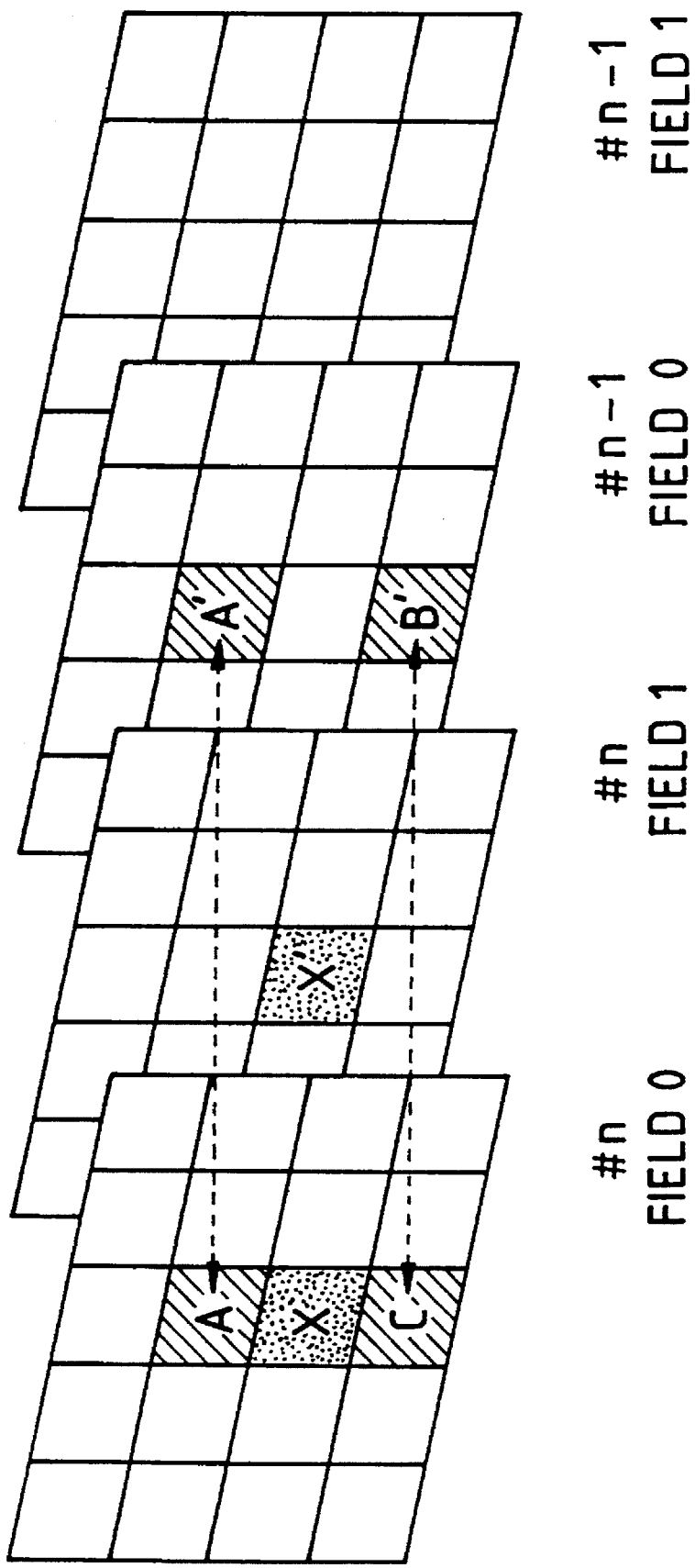
FIG. 9 is a view for explaining a movement estimation operation in the circuit shown in FIG. 8.

The relationship between the error block and movement detection blocks input to the movement discrimination circuit 405 will be described below with reference to FIG. 9. FIG. 9 illustrates 8×4 pixels as one block in units of fields. Referring to FIG. 9, the difference absolute value sum (the output $\hat{2}$) of a block A in field 0 of frame #n and a block A' in field 0 of frame #n−1, and the difference absolute value sum (the output $\hat{1}$) of a block B in field 0 of frame #n and a block B' in field 0 of frame #n−1 are used for estimating the movement of a block X (target block) in field 0 of frame #n. Note that movement detection blocks for estimating movement of a block X' in field 1 of frame #n use blocks one field before the blocks A and B, respectively.

The operation of an activity estimation circuit 310 will be described below.

Activity data is determined based on orthogonal transform coefficients used upon execution of orthogonal transform of image data, and is information used upon quantization of the orthogonal transform coefficients.

Figure 10A:
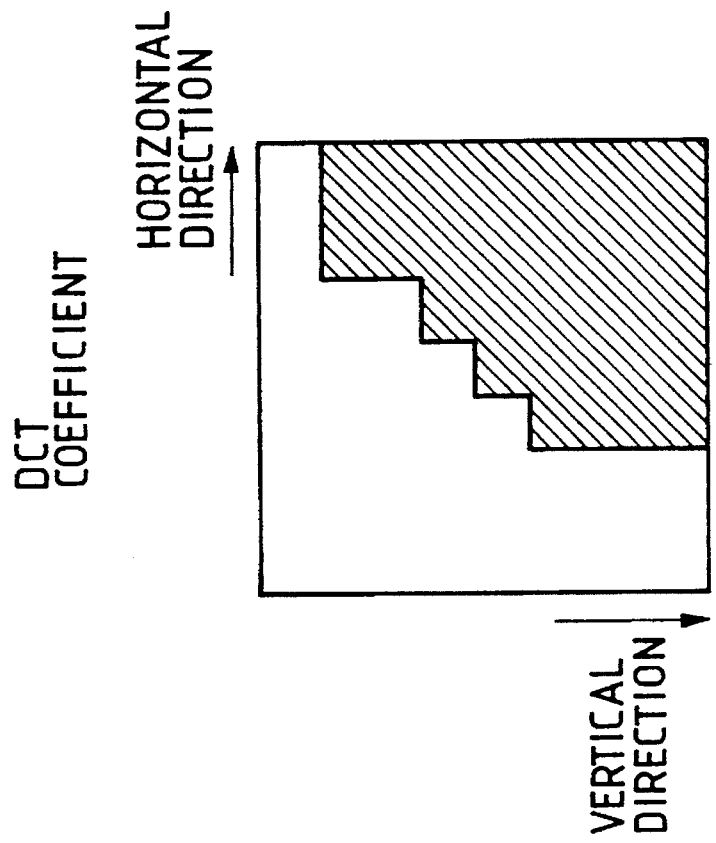
FIGS. 10A and 10B are views for explaining activity data.
Figure 10B:
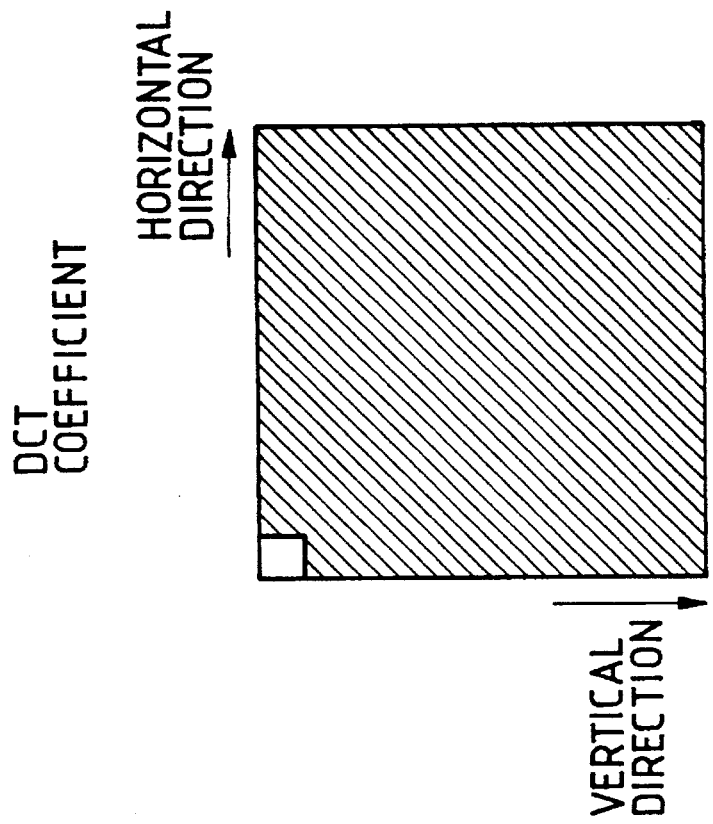
Figures 11, 12:
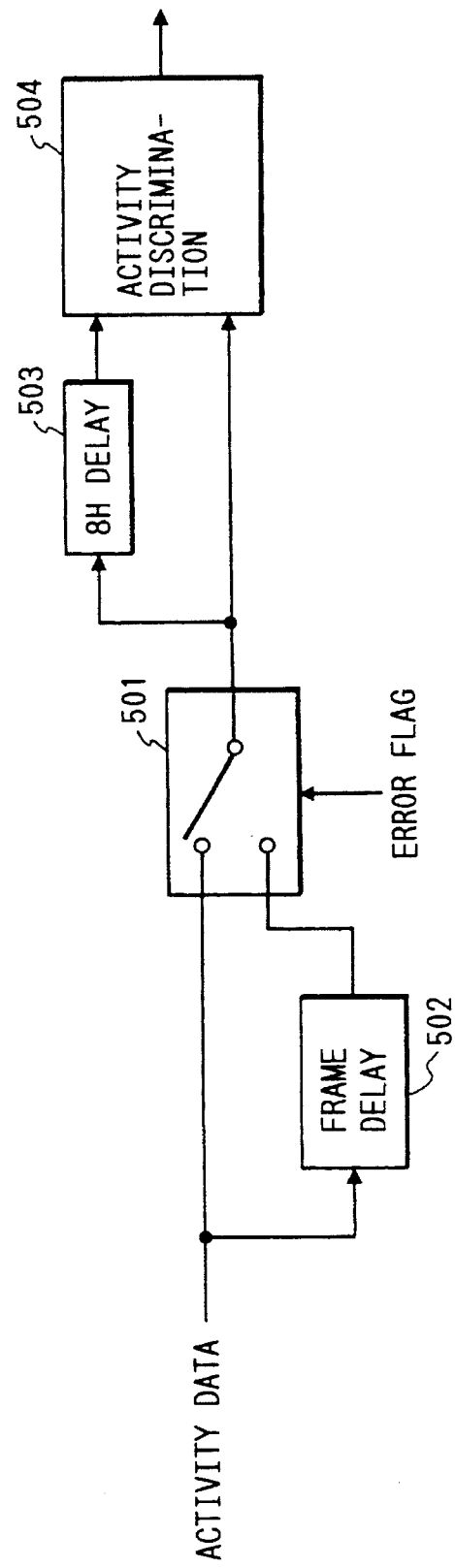
FIG. 11 is a view for explaining an activity discrimination method.
FIG. 12 is a block diagram showing the arrangement of an activity estimation circuit in FIG. 7.

FIGS. 10A and 10B and FIG. 11 are explanatory views of activity data. FIG. 10A shows a whole AC (alternating current) area (full area) of orthogonal transform coefficients upon execution of orthogonal transform of image data in a block, and FIG. 10B shows a high-frequency (H) area in the AC area. In order to determine activity data, the number (Nf) of coefficients larger than a threshold value TH1 in the full area and the number (Nh) of coefficients larger than a threshold value TH2 in the H area are counted, and the Nf and Nh are compared with numerical values shown in FIG. 11, thereby determining an activity class. When different activity classes are determined based on the Nf and Nh, a larger activity class is used. Since the activity class is determined, as described above, the activity data has high-frequency component information in the corresponding block, as can be understood from the above description.

FIG. 12 shows the arrangement of the activity estimation circuit 310. Activity data from the activity memory 306 is supplied to a switch circuit 501. The switch circuit 501 normally selects the output from the activity memory 306. If it is determined based on the error flag that activity data of error data is input, the switch circuit 501 selects activity data one frame before, as the output from a frame delay circuit 502. The output data from the switch circuit 501 is supplied to an 8H delay circuit 503 and an activity discrimination circuit 504, and is delayed by 8H (two blocks) by the 8H delay circuit 503. The activity discrimination circuit 504 receives the activity data from the 8H delay circuit 503 and the switch circuit 501, and outputs their central value as an estimation result to the interpolation means discrimination circuit 313. This indicates that activity data of the blocks A and B are used for estimating the activity class of the block X in FIG. 9. When the activity discrimination circuit 504 cannot select the central value of the input data like in a case wherein the circuit 504 receives values "2" and "3" or "1" and "2", it selects a larger value.

The interpolation means discrimination circuit 313 receives the movement estimation result from the movement estimation circuit 309, the activity estimation result from the activity estimation circuit 310, and the error flag. The discrimination method of the interpolation means discrimination circuit 313 will be described below with reference to FIG. 13. FIG. 13 summarizes discrimination results in correspondence with the input movement estimation result and activity estimation result. In this embodiment, blocks have less high-frequency components in activity classes 0, 1, and 2, and block have many high-frequency components in activity class 3. As can be seen from FIG. 13, when it is discriminated that there is a movement, interframe or intrafield interpolation is selected depending on the activity estimation result. For this reason, the activity estimation result becomes important. When the above-mentioned activity discrimination circuit 504 receives input values "3" and "2", it selects "3". However, this selection method can be appropriately changed in accordance with its purpose.

For example, when the activity discrimination circuit 504 receives input values "3" and "2", if it is controlled to select "2", intrafield interpolation is selected when it is determined that there is a movement, as in the above embodiment, and strong interpolation is performed for the movement. On the other hand, if the circuit 504 is controlled to select "3" in this case, interframe interpolation is selected, and interpolation is performed using a high-definition image.

The selection circuit 314 receives intrafield concealed image data and interframe concealed image data or normally reproduced image data. The output signal from the movement estimation circuit 309 as the interframe concealed data is delayed by 8H by the 8H delay circuit 311. This is to synchronize the output timing of the interframe concealed data to the selection circuit 314 with the output timing of the movement estimation result from the movement estimation circuit 309 to the selection circuit 314. More specifically, in order to discriminate the movement of the block X in FIG. 9, the movement estimation circuit 309 requires the difference absolute value sum of the block B, and in order to estimate the activity class of the block X, the activity estimation circuit 310 requires activity data of the block B. For this reason, the output signal from the movement estimation circuit 309 is delayed by 8H corresponding to the difference between the uppermost line in the block X and the lowermost line in the block B, thereby synchronizing the timings. In contrast to this, an intrafield concealment circuit 312 starts a calculation of interpolated data upon reception of data in the block B which is assumed to be the current input data, and its output timing is synchronized with the output timing of the interpolation means discrimination circuit 313. For this reason, the output from the circuit 312 need not be delayed.

In this manner, upon reception of the concealed data and the interpolation means discrimination result, the selection circuit 314 selects the intrafield concealed data or the interframe concealed data, and outputs the selected data from an output terminal 315. Normally, the selection circuit 314 selects the output from the intrafield concealment circuit 312, and normally decoded image data is output from the output terminal 315 through the intrafield concealment circuit 312.

As described above, according to this embodiment, the movement of an error block is estimated by calculating the difference absolute value sums of the upper and lower adjacent blocks of the error block in the same field as this error block, and an activity class of the error block is estimated based on activity data of the upper and lower blocks of the error block. Then, concealed data of the error data is adaptively selected on the basis of the movement estimation result and the activity estimation result, thus obtaining an image free from visual deterioration.

Figure 14:
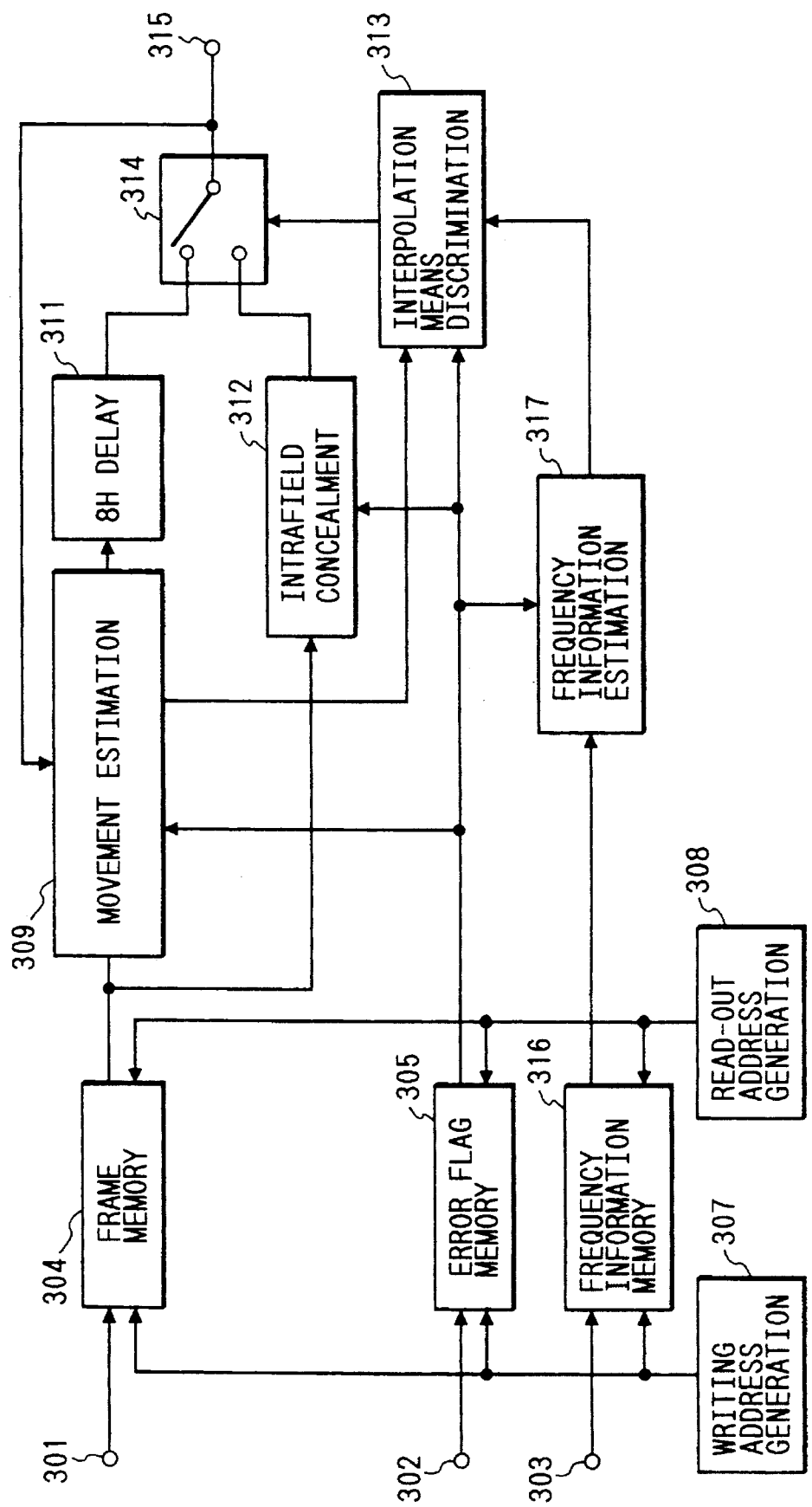
FIG. 14 is a block diagram showing another arrangement of the interpolation circuit in FIG. 6.

The third embodiment of the present invention will be described below with reference to FIGS. 14 and 15. Note that the same reference numerals in this embodiment denote the same or corresponding parts as in the second embodiment, and a detailed description thereof will be omitted.

In this embodiment, the absolute value sum of DCT coefficients of each block is used as frequency information in place of activity data. The frequency information estimation operation of an error block in this embodiment will be described below with reference to FIG. 15. FIG. 15 shows two-dimensional DCT coefficients. In FIG. 15, the DCT coefficients in the horizontal direction have higher frequencies toward the right side, and those in the vertical direction have higher frequency toward the lower side.

In the discrimination method in each block, the absolute value sum of DCT coefficients in a hatched portion is compared with a certain threshold value. If the absolute value sum is larger than the threshold value, it is determined that the number of high-frequency components is large; otherwise, it is determined that the number of high-frequency components is small. A frequency information estimation circuit 317 estimates frequency information of an error block using those of the upper and lower blocks of the error block in the same manner as in the second embodiment. The frequency information of the error block is supplied to the interpolation means discrimination circuit 313, and is discriminated, as shown in FIG. 13. The selection circuit 314 selects and outputs data based on the discrimination result from the circuit 313.

Figure 15:
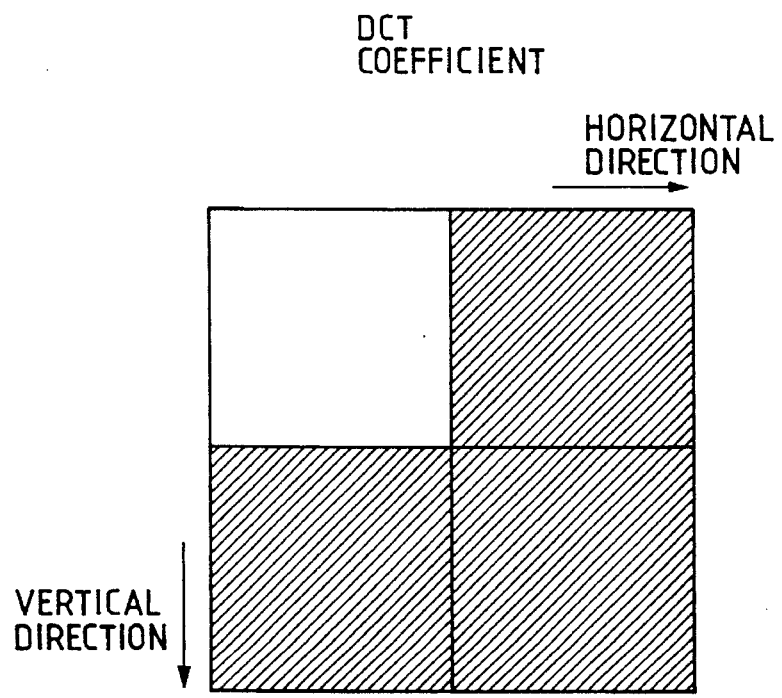
FIG. 15 is a view for explaining frequency information.

In this embodiment, the absolute value sum of DCT coefficients in the hatched portion in FIG. 15 is used as the frequency information. Alternatively, the number of high-frequency components in a block may be discriminated based on the magnitude of a maximum DCT coefficient in the hatched portion.

In the second and third embodiments, the upper and lower blocks adjacent to an error block in the same field are selected as movement detection blocks and frequency information blocks. However, the present invention is not limited to these blocks as long as they are adjacent to the error blocks. For example, the same effects as in the above embodiments can be obtained even if blocks adjacent to the error block in the right-and-left direction are selected.

As can be apparent from the above description, in the second and third embodiments of the present invention, frequency information of adjacent blocks are used upon concealment of data in an error block. Therefore, if the blocks adjacent to the error block include a high-definition image, interframe interpolation is performed, i.e., interpolation using high-definition image information is performed, and an image free from visual deterioration can be obtained.

When interframe or intrafield interpolation is selected by estimating the movement of an error block based on the movement states of adjacent blocks, the error block is concealed using the sum of the frequency information estimation result of the error block based on the frequency information of the adjacent blocks to the movement estimation result of the error block. For this reason, when the error block includes a high-definition image and a movement, intrafield interpolation regardless of high-definition images in the blocks adjacent to the error block can be prevented. Therefore, a low-resolution block can be prevented from being present in a high-definition image. For this reason, even in an image obtained by interpolating the error block, a change in resolution which gives a poor appearance can be eliminated, and a totally well-balanced image can be obtained.

Figure 16:
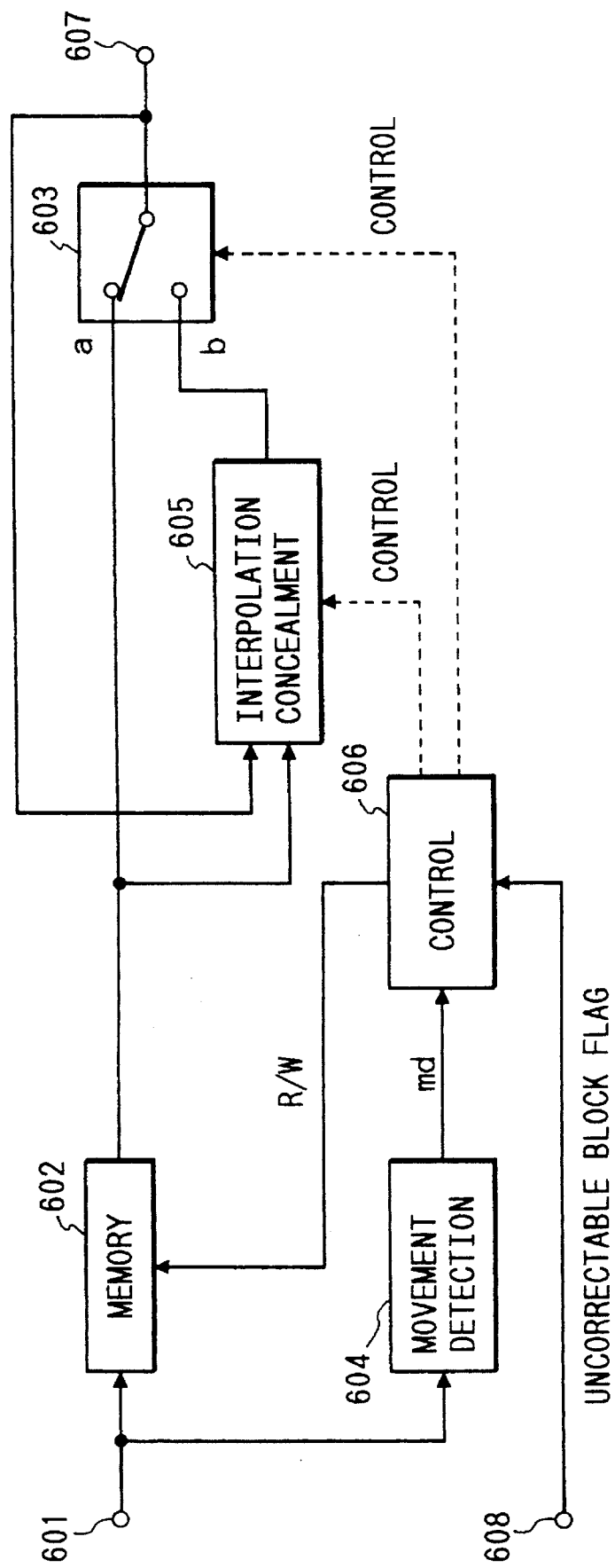
FIG. 16 is a block diagram showing another arrangement of an interpolation circuit in FIG. 1.

The fourth embodiment of the present invention will be described below. FIG. 16 is a block diagram showing the arrangement of the interpolation circuit 13 shown in FIG. 1. In this embodiment as well, image data processing is executed in units of fields, i.e., in units of blocks each consisting of 8 pixels (horizontal)×4 pixels (line).

Referring to FIG. 16, image data from the frame memory 12 is input from an input terminal 601 in the order of normal interlace scanning. In synchronism with this input data, an error flag indicating that input data is undecodable is input from an input terminal 608. The input image data is written in a memory 602 having a capacity corresponding to two frames. The image data is read out under the control of a control circuit 606 (to be described later).

The input image data is also input to a movement detection circuit 604. The circuit 604 estimates the movement of an error block based on the movements of adjacent blocks, and outputs the estimation result to the control circuit 606. The control circuit 606 receives the above-mentioned error flag in addition to this movement estimation result. The control circuit 606 reads out data necessary for the subsequent interpolation operation from the data stored in the memory 602 on the basis of the movement estimation result and the error flag, and outputs the readout data. The control circuit 606 controls a switch circuit 603 to connect it to the a side when data read out from the memory 602 is not error data, and to connect it to the b side when error data is read out.

The data necessary for interpolation is read out from the memory 602 and is input to an interpolation concealment circuit 605. The interpolation concealment circuit performs interpolation to generate interframe interpolated data and intrafield interpolated data based on a control signal from the control circuit 606, and outputs the interpolated data.

Figure 17:
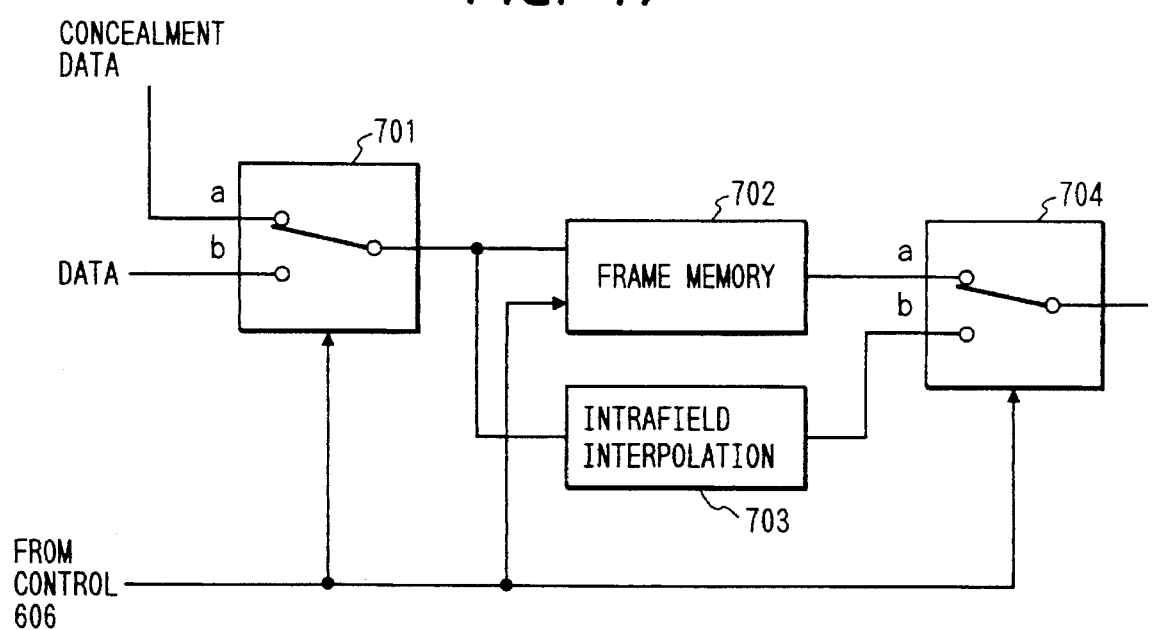
FIG. 17 is a block diagram showing an interpolation concealment circuit in FIG. 16.

FIG. 17 is a block diagram showing the arrangement of the interpolation concealment circuit 605. A switch circuit 701 receives data read out from the memory 602 and normally concealed data. When it is determined based on the received error flag that the data read out from the memory 602 is error data, the switch circuit 701 is switched to the side of the concealed data (a side). The output from the switch circuit 701 is supplied to a frame memory 702 and an intrafield interpolation circuit 703, and interframe interpolated data and intrafield interpolated data are generated, as will be described later. The interpolated data are output to a switch circuit 704. Upon reception of a signal from the control circuit 606, the switch circuit 704 is switched to output the interframe interpolated data and the intrafield interpolated data.

Figure 18:
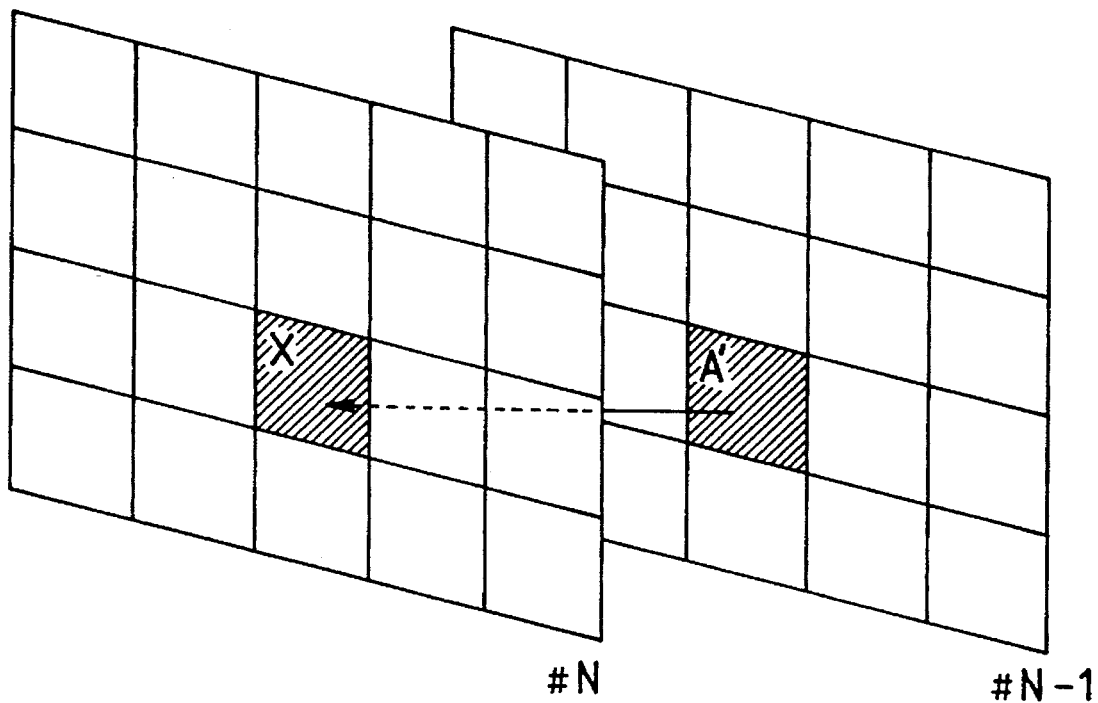
FIG. 18 is a view for explaining interframe interpolation.

The method of the above-mentioned interframe interpolation and intrafield interpolation will be described below. In the interframe interpolation, if a block X in frame #N in FIG. 18 is an error block, data in the block X is interpolated by replacing it by decoded data of a block A' at the same position on the screen in the previous frame #N−1.

The operation of the intrafield interpolation circuit 703 will be described below. This interpolation circuit performs interpolation using pixels closest to the error block in two blocks which are adjacent to the error block in an oblique direction.

Figure 19:
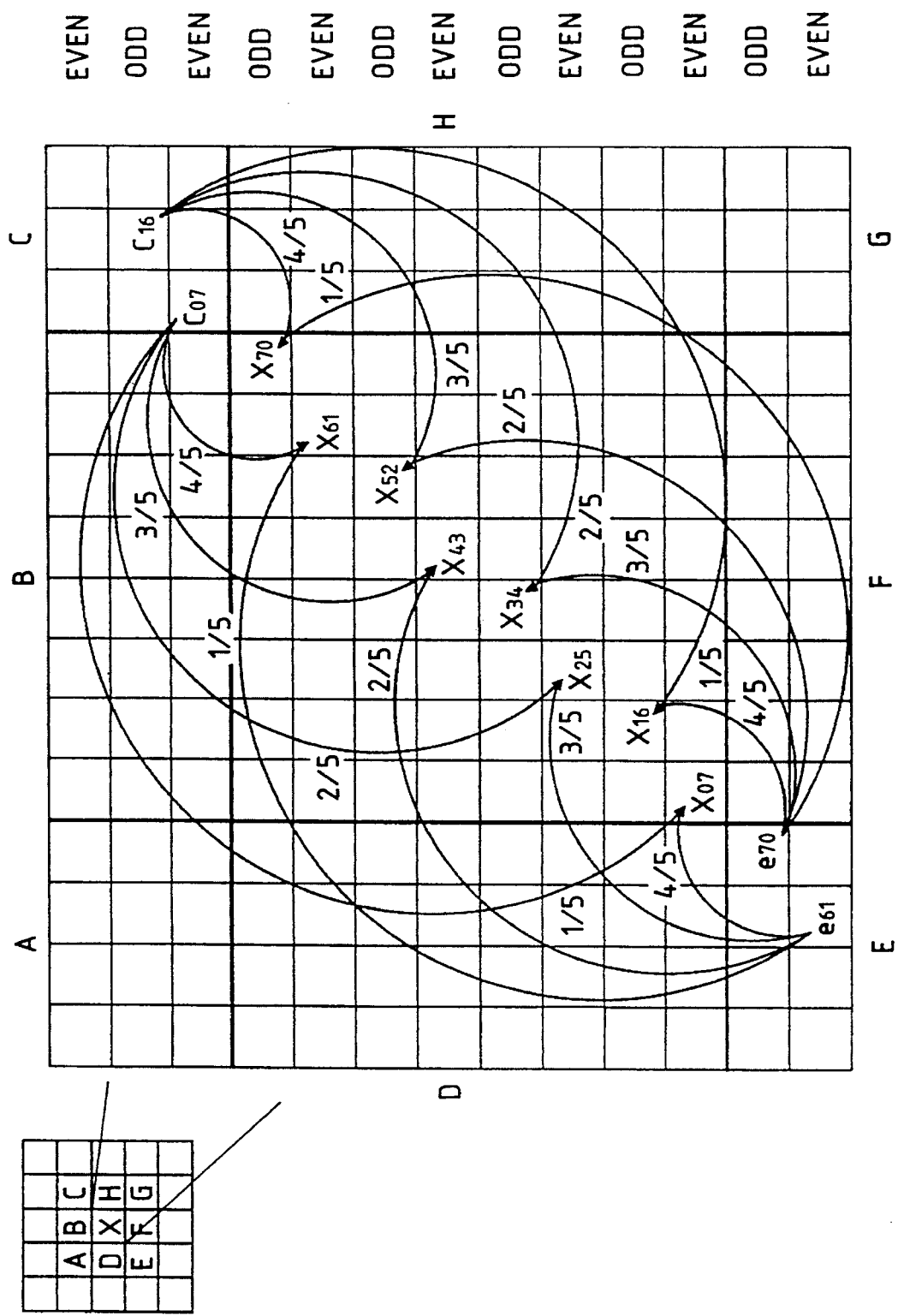
FIG. 19 is a view for explaining intrafield interpolation by the circuit shown in FIG. 17.

First, data in odd fields are interpolated. Referring to FIG. 19, linear interpolation is performed according to the distances to data to be interpolated using data $c_{16}$ as data, closest to the block X, of data in odd fields of a block C, and data $e_{70}$ as data, closest to the block X, of data in odd fields of a block E with respect to image data $(x_{70}, x_{52}, x_{34}, x_{16})$ in odd fields on a diagonal line of the error block X. More specifically, the interpolation is performed as follows in the odd fields: $x_{70}=(4 \times c_{16}+e_{70})/5$, $x_{52}=(3 \times c_{16}+2 \times e_{70})/5$, $x_{34}=(2 \times c_{16}+3 \times e_{70})/5$, and $x_{16}=(C_{16}+4 \times e_{70})/5$.

Upon completion of the interpolation processing in the odd fields, processing in the even fields is similarly performed. In the even fields, image data $(x_{61}, x_{43}, x_{25}, x_{07})$ are interpolated using data $c_{07}$ in the block C and data $e_{61}$ in the block E.

Figure 20:
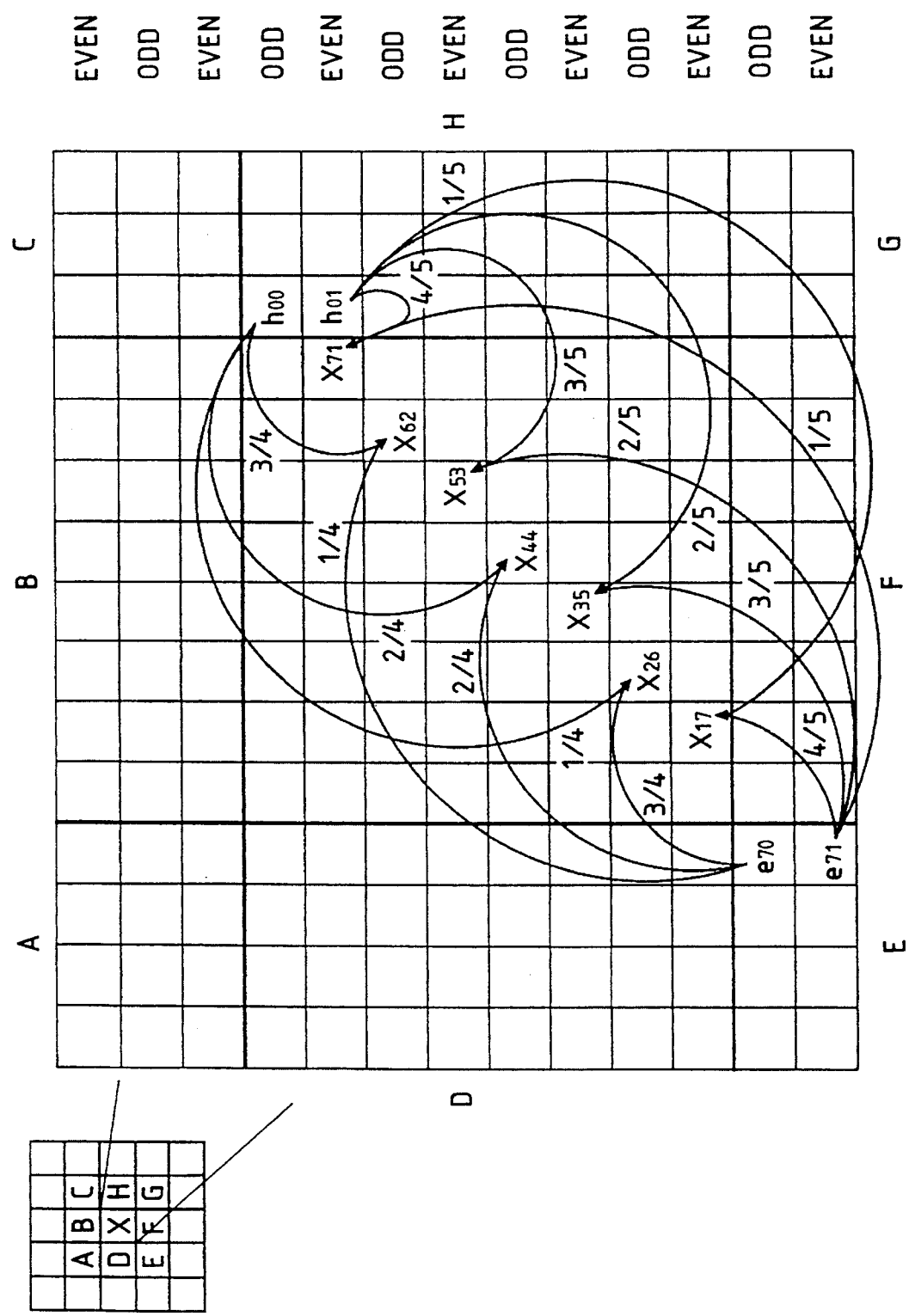
FIG. 20 is a view for explaining intrafield interpolation by the circuit shown in FIG. 17.
Figure 21:
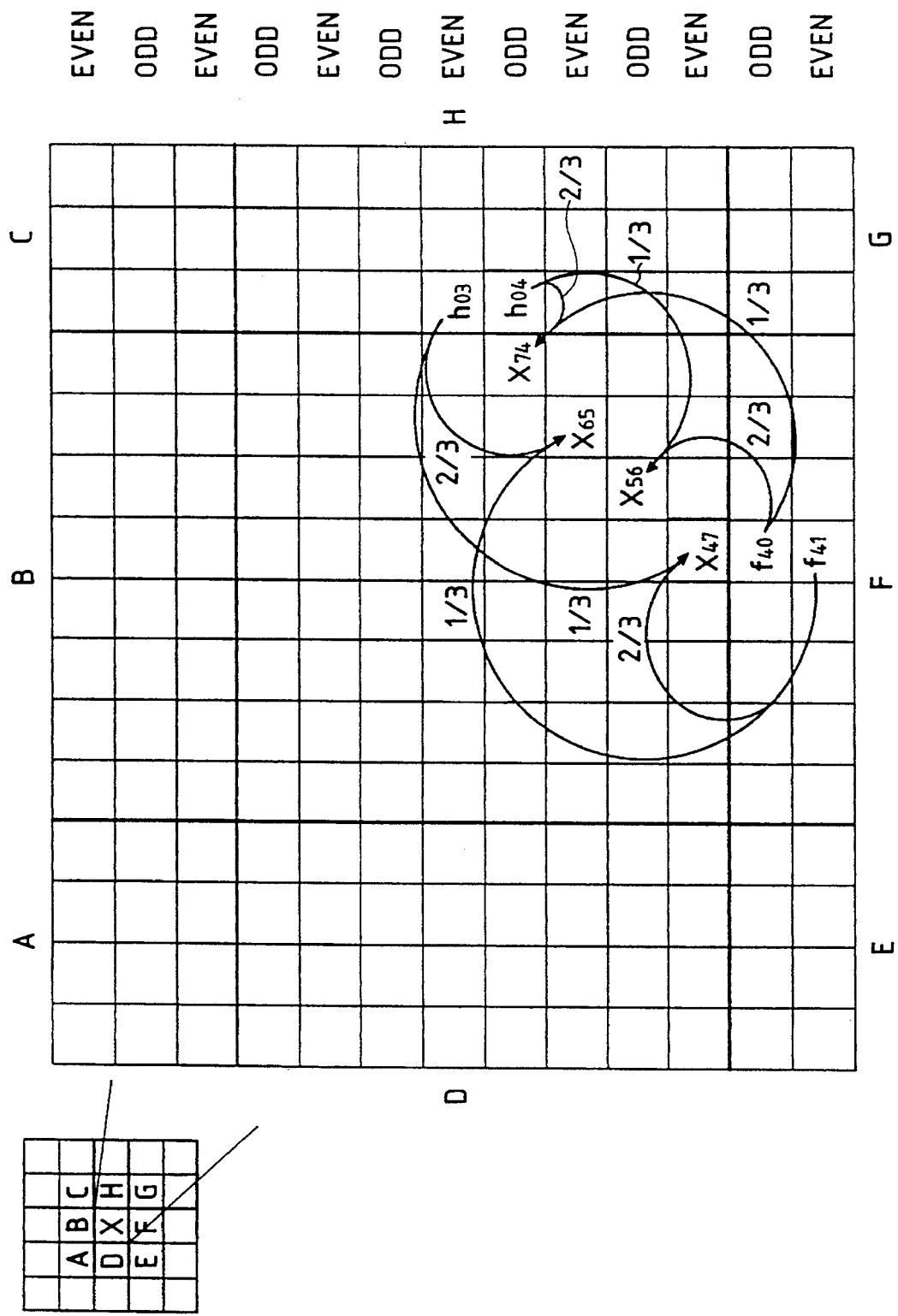
FIG. 21 is a view for explaining intrafield interpolation by the circuit shown in FIG. 17.

Interpolation of data in portions other than the diagonal line is performed in basically the same manner as in FIG. 19. FIGS. 20 and 21 show this state. Referring to FIG. 20, image data $(x_{71}, x_{53}, x_{53}, x_{17})$ are interpolated using data $h_{01}$ in a block H and data $e_{71}$ in the block E, and image data $(x_{62}, x_{44}, x_{26})$ are interpolated using data $h_{00}$ in the block H and data $e_{70}$ in the block E. Referring to FIG. 21, image data $(x_{74}, x_{56})$ are interpolated using data $h_{04}$ in the block H and data $f_{40}$ in a block F, and image data $(x_{65}, x_{47})$ are interpolated using data $h_{03}$ in the block H and data $f_{41}$ in the block F.

Figure 22:
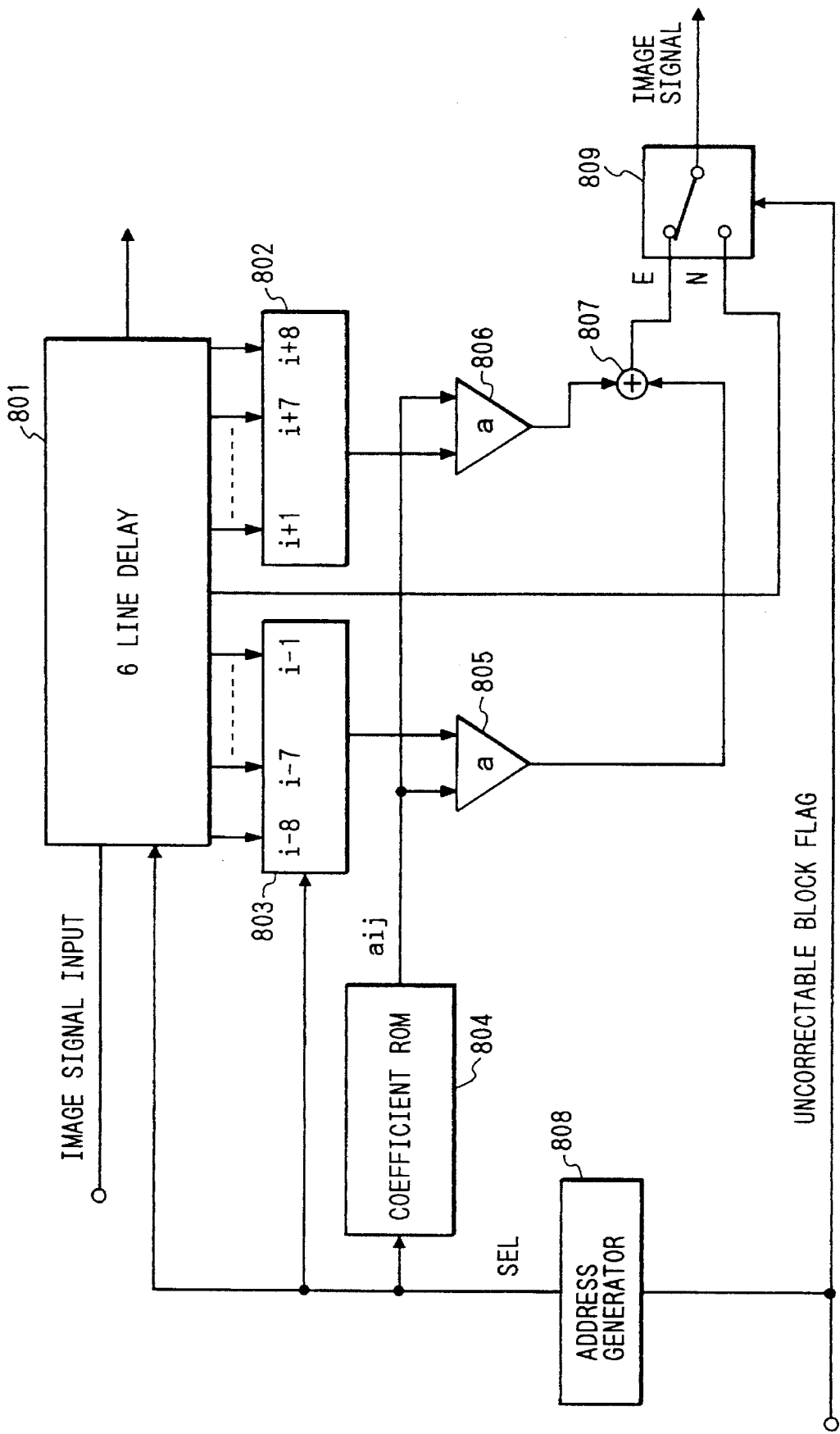
FIG. 22 is a block diagram showing the arrangement of an intrafield interpolation circuit in FIG. 17.
Figure 23:
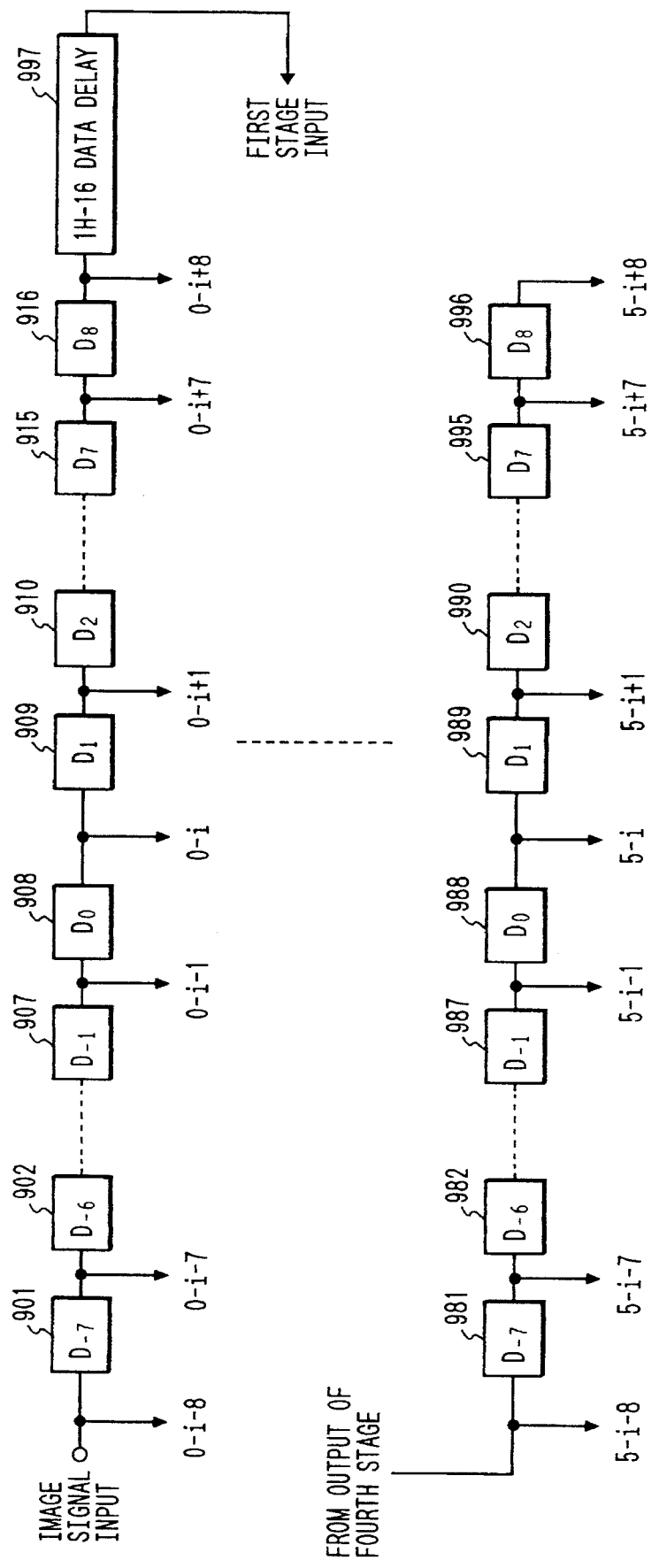
FIG. 23 is a block diagram showing the arrangement of a 6-line delay circuit in FIG. 22.
Figure 24:
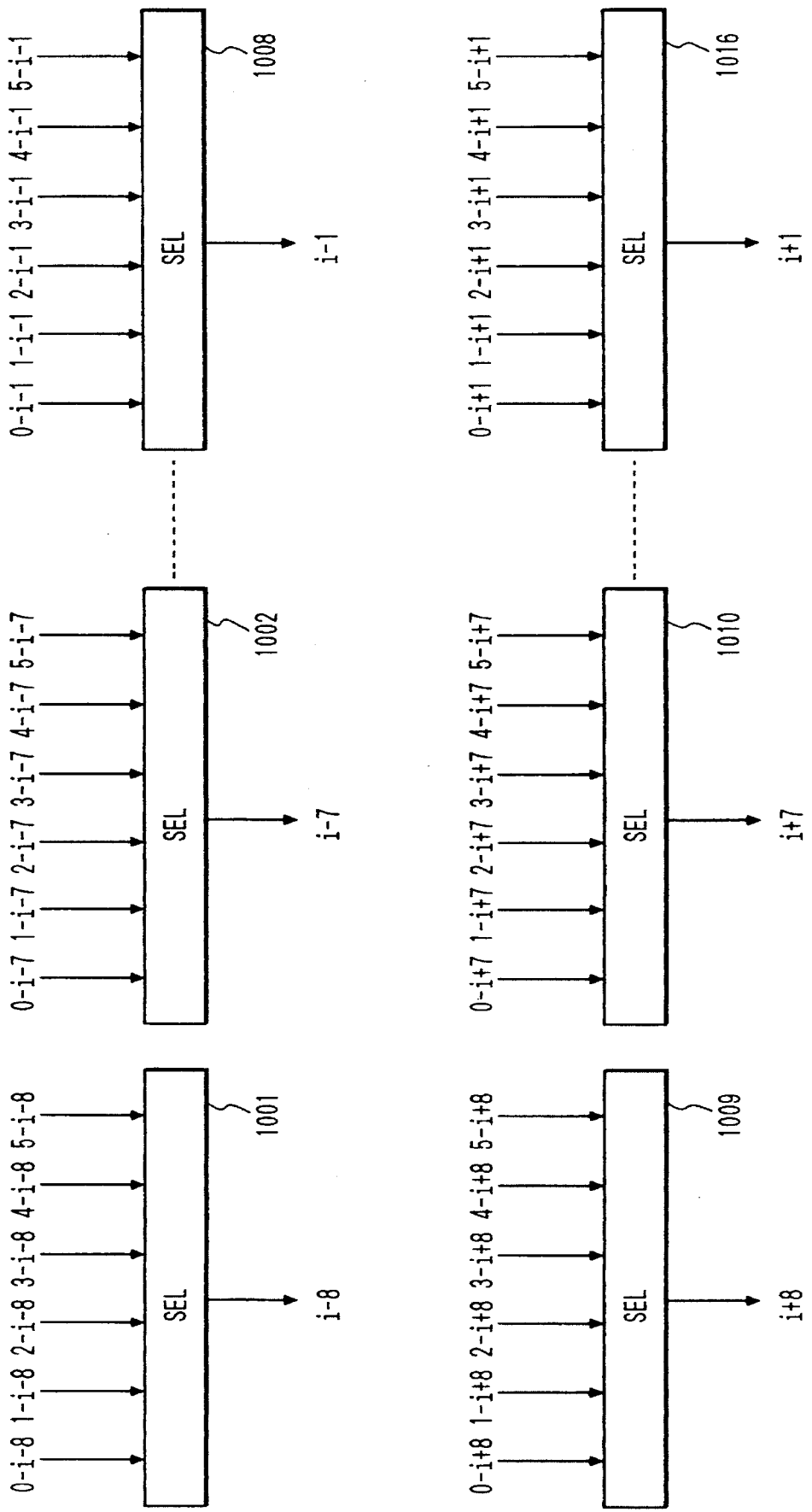
FIG. 24 is a block diagram showing the arrangement of a selection circuit in FIG. 22.

The intrafield interpolation circuit 703 will be described below with reference to FIGS. 22 to 24. FIG. 22 is a block diagram showing the arrangement of the intrafield interpolation circuit 703. Image data is input in units of fields, and a 6-line delay circuit 801 selects data necessary for interpolation. FIG. 23 shows the arrangement of the 6-line delay circuit 801, and in its arrangement for one line, 1-data delay elements 901 to 916 and a 1H-16 delay circuit 997 are connected in series with each other, so that 17 different data at the two-end sides of the delay elements can be output. Furthermore, six stages of this arrangement for one line are connected in series with each other (the sixth stage consists of only the 1-data delay elements), so that (17×6) different image data of blocks adjacent to the error block can be output. In each stage, data i is used as reference (current) data of the line, and image data delayed by delay amounts for eight data before and after the current data, i.e., by 17 different delay amounts, are output, and 16 different data are selected by selector circuits 1001 to 1016 in units of delay amounts. This selection operation is determined by the address of error data.

In this manner, 16 different data i−8 to i+8 are selected by the 6-line delay circuit 80, and are supplied to selection circuits 802 and 803. The selection circuit 802 receives the address of the error data from an address generator 808, and selects data having a delay amount necessary for the above-mentioned interpolation in the oblique direction from data i−8 to i−1 in the horizontal direction with respect to data i in units of lines. The selection circuit 803 similarly selects one data from data i+8 to i+1 in units of lines. The data selected by the selection circuits 802 and 803 are respectively output to multipliers 805 and 806, and are multiplied with a coefficient read out from a coefficient ROM 804.

The error flag is input to the address generator 808 and a switch circuit 809. Upon reception of the error flag, the address generator 808 detects the address of the error data in the block, and outputs the detected address to the 6-line delay circuit 801, the selection circuits 802 and 803, and the coefficient ROM 804. Upon reception of the address of the error data, the coefficient ROM 804 detects the position of the data in the block, and outputs an optimal coefficient at the detected position.

The data multiplied with the coefficient in the multipliers 805 and 806 are output to an adder 807, and are added to each other. The sum data is output to the switch circuit 809. The switch circuit 809 is controlled by the error flag, and is switched to the E (Error) side only when the error flag is set.

The above-mentioned interpolation operation and the output data from the selection circuit 802 and 803 in FIG. 22 will be compared. In the delay circuit shown in FIG. 23, assuming that data 0−i+5 (the 0-th stage) outputs data $c_{16}$ in FIG. 19, data in the first stage correspond to those two lines therebelow in FIG. 19, and 16 data are selected for each line. Therefore, data 5−i−5 (the fifth stage) outputs data $e_{70}$. Then, each of the selector circuits 1001 to 1016 shown in FIG. 24 selects one data for each delay amount from 16 data, excluding data i, in each line on the basis of the address of the error data, i.e., a total 16 data are selected. The selected data indicate that data are selected one by one from vertical lines of data of blocks adjacent to the error block. The selection circuits 802 and 803 finally select data having delay amounts to be used in interpolation from the selected data. More specifically, when data $(xT0, x_{52}, x_{34}, x_{16})$ in FIG. 19 are to be interpolated, data and $e_{70}$ are selected.

As described above, interframe and intrafield interpolated error data (in practice, error data subjected to one interpolation processing under the control of the control circuit) are output to the switch circuit 704. The switch circuit 704 selects and outputs one of these two interpolated data in accordance with a signal received from the control circuit 606.

The interpolated data is output to the terminal b of the switch circuit 603. The switch circuit 603 selects one of error-free data from the terminal a and the interpolated data from the terminal b, and outputs the selected data from the output terminal 607.

In this embodiment, when an image includes a movement, since intrafield interpolation is performed in the oblique direction, interpolation can be performed using data with a visually stronger correlation.

The fifth embodiment of the present invention will be described below with reference to FIGS. 25 to 28. The same reference numerals in this embodiment denote the same or corresponding parts as in the fourth embodiment, and a detailed description thereof will be omitted.

In this embodiment, in order to determine interpolation processing, an estimation result obtained by estimating a spectrum of each block is used in addition to movement information.

Figure 25:
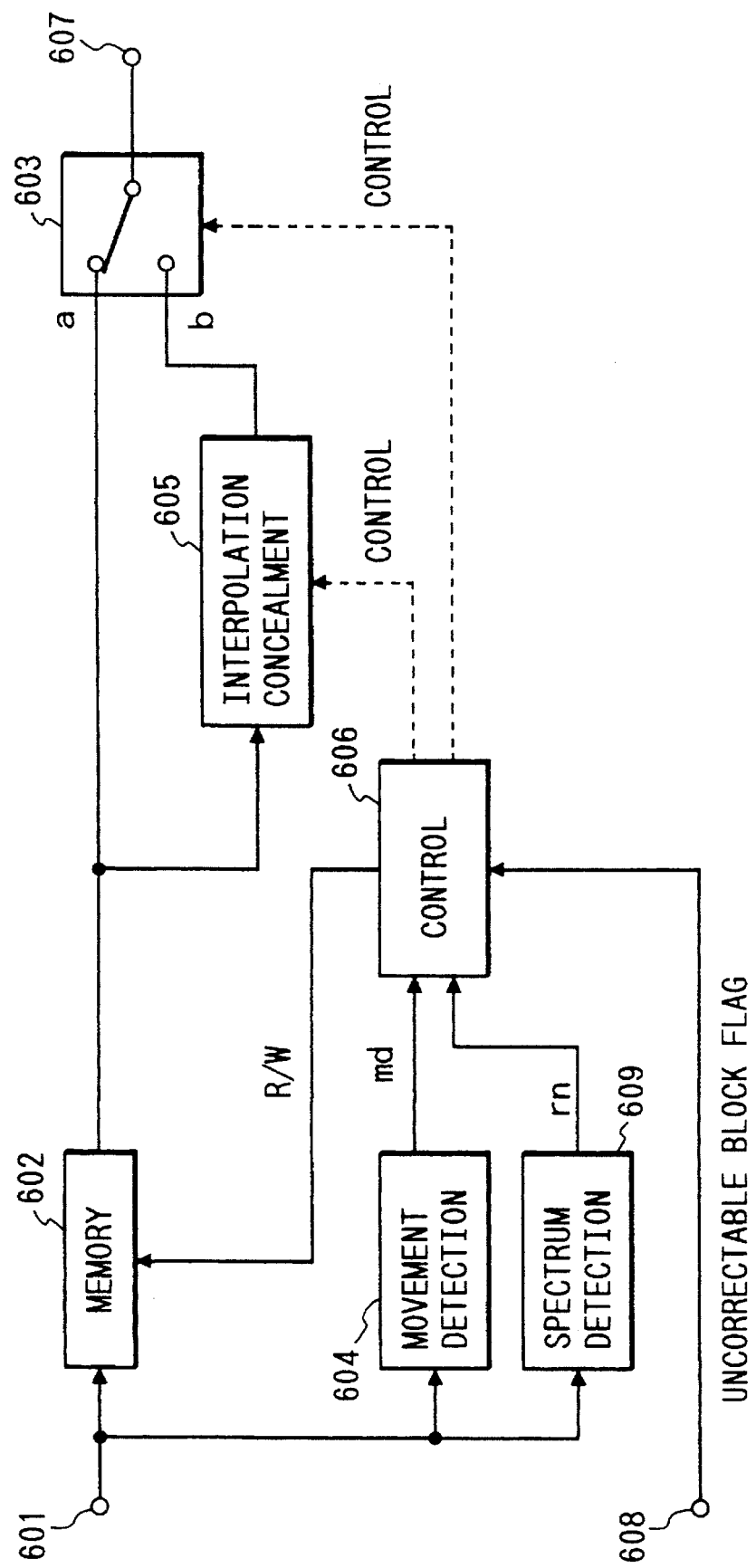
FIG. 25 is a block diagram showing still another arrangement of the interpolation circuit in FIG. 1.
Figure 26:
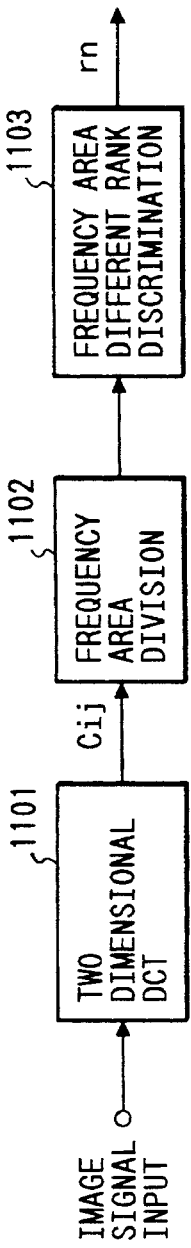
FIG. 26 is a block diagram showing the arrangement of a spectrum detection circuit in FIG. 25.
Figure 27:
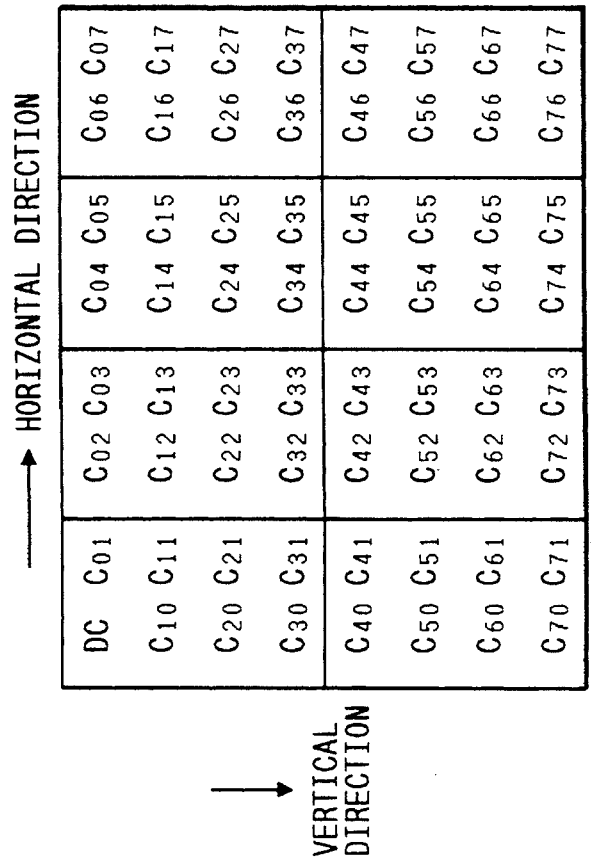
FIG. 27 is a view for explaining the operation of the circuit shown in FIG. 26.
Figure 28:
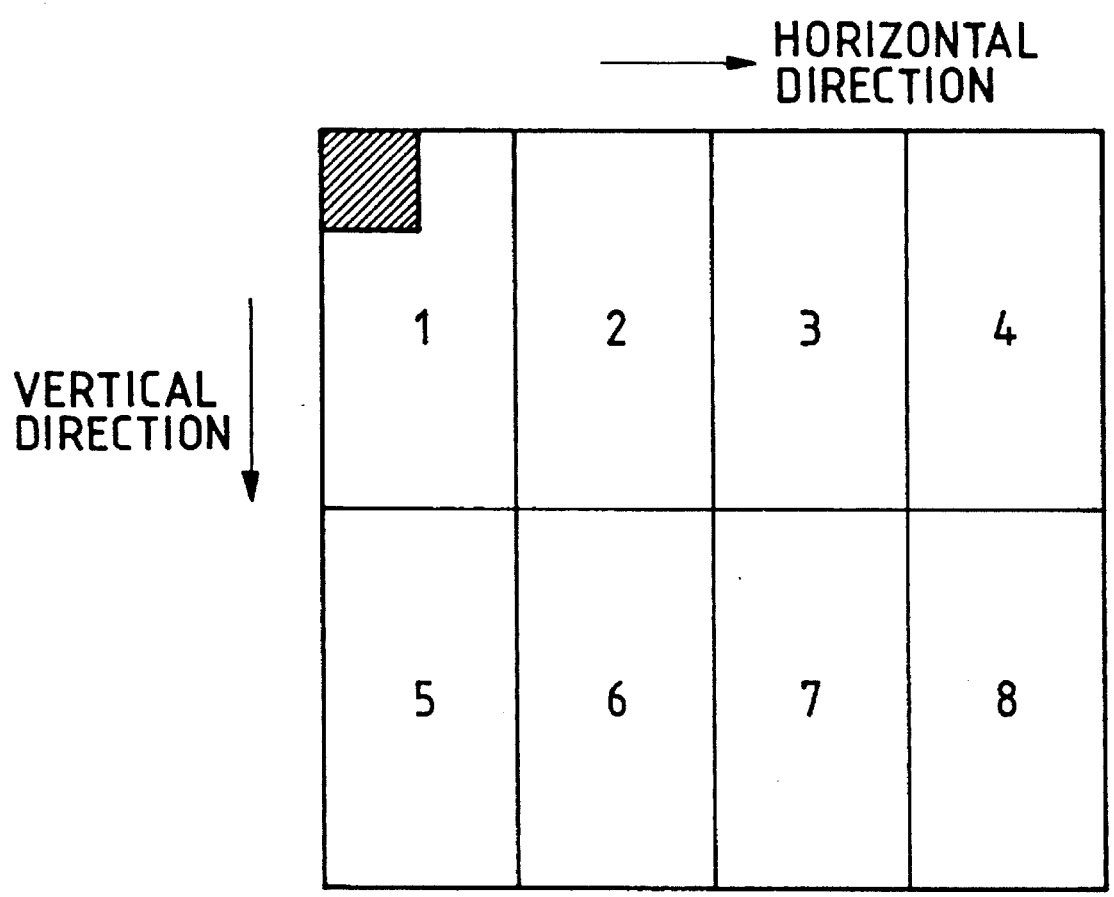
FIG. 28 is a view for explaining the operation of the circuit shown in FIG. 26.

Referring to FIG. 25, a spectrum detection circuit 609 detects the spectrum level of an error block from the spectrum levels of blocks adjacent to the error block, and outputs the detected spectrum level. The operation of the spectrum detection circuit 609 will be described below with reference to FIGS. 26 to 28. Referring to FIG. 26, input image data is subjected to DCT in a DCT circuit 1101. FIG. 27 shows coefficients of this DCT. The DCT coefficients are divided into areas shown in FIG. 28 by a frequency area division circuit 1102. A rank discrimination circuit 1103 evaluates and outputs the energy strengths of the divided areas. More specifically, the level of the DCT coefficient in each area is compared with a certain threshold value, thereby determining a rank of the movement in the area. In this case, rank signals are output in correspondence with a case wherein the area includes many high-frequency components in the horizontal direction (areas 3 and 4 in FIG. 28), and a case wherein the area includes many high-frequency components in the oblique direction (areas 7 and 8 in FIG. 28). Then, the spectrum level of the error block is estimated from spectrum data of blocks adjacent to the error block (in this case, the upper and lower blocks adjacent to the error block).

The control circuit 606 receives the movement detection result and the spectrum detection result. When it is determined that the number of high-frequency components in the horizontal direction is large, and a movement is detected, the control circuit 606 outputs a signal for controlling the interpolation circuit 605 to perform intrafield interpolation in units of horizontal lines shown in FIG. 4. On the other hand, when it is determined that the number of high-frequency components in the oblique direction is large, and a movement is detected, the control circuit 606 outputs a signal for controlling the interpolation circuit 605 to perform intrafield interpolation in the oblique direction described in the fourth embodiment.

When a movement of an image is detected, if the number of high-frequency components in the horizontal direction is large, intrafield interpolation in units of lines is performed; if the number of high-frequency components in the oblique direction is large, intrafield interpolation in the oblique direction is performed. Thus, interpolation suitable for a correlation between an image block and adjacent blocks can be performed. Therefore, deterioration of an image is not visually conspicuous.

As can be seen from the above description, in the fourth and fifth embodiments, upon concealment of data in an error block, interpolation in the oblique direction is performed as intrafield interpolation.

In general, since the visual characteristics of man have a lower sensitivity level in oblique directions than those in the horizontal and vertical directions, in a system for performing compression and encoding using, e.g., orthogonal transform, the frequency characteristics, in oblique directions, of an image signal are reduced in advance. In an image signal, since the occupation ratio of components in oblique directions is lower than those in the vertical and horizontal directions, and a correlation among pixels is high, when intrafield interpolation is performed using data in blocks located in an oblique direction of an error block like in the present invention, a distortion (e.g., discontinuity of a pattern) of an image does not become conspicuous, and the effect of interpolation concealment is very high.

Since the spectrum level of the error block is estimated on the basis of the spectrum levels of adjacent blocks in addition to the movement states of the adjacent blocks, one of interframe interpolation, intrafield interpolation in units of lines, and intrafield interpolation in the oblique direction is selected. When an image includes a movement and has many high-frequency components in the horizontal direction, intrafield interpolation in units of lines is performed; when an image includes a movement and has many high-frequency components in the oblique direction, intrafield interpolation in the oblique direction is performed. For this reason, when the error block includes a high-definition image and a movement, interpolation can be performed using data with a stronger correlation, and a low-resolution block can be prevented from being present in a high-definition image. Even in an image obtained by interpolating an error block, a change in resolution which gives an uneasy feeling can be eliminated, and a totally well-balanced image can be obtained.

In each of the above embodiments, the present invention is applied to the digital VTR. The present invention can also be applied to an apparatus for receiving an image which is transmitted after it is compressed and encoded in correspondence with certain standards (e.g., MPEG), and decoding the received image, and the same effects as described above can be provided.

What is claimed is:

1. An image reproducing apparatus comprising:

(a) reproducing means for reproducing image data from a recording medium;

(b) error detection means for detecting error data in the image data reproduced by said reproducing means;

(c) motion detection means for detecting a motion of the error data by using the image data reproduced by said reproducing means to output motion data indicating a degree of the motion of the error data, the motion data being multi-valued; and (d) construction means for constructing image data with respect to the error data on the basis of the motion data from said motion detection means.

2. An apparatus according to claim 1, wherein the image data are block-encoded image data, and said movement detection means detects a movement in units of blocks.

3. An apparatus according to claim 2, wherein said motion detection means outputs data indicating a degree of movement of a block including the error data on the basis of an interframe difference between image data of blocks adjacent to the block including the error data.

4. An apparatus according to claim 1, wherein said construction means comprises an intraframe construction circuit for constructing an image data using image data of a frame including the error data, and an interframe construction circuit for constructing image data using image data of a frame different from the frame including the error data.

5. An apparatus according to claim 4, wherein said construction means comprises a synthesization circuit for synthesizing the image data from said intraframe construction circuit and the image data from said interframe construction circuit in accordance with the degree of movement of the error data.

6. An image reproducing apparatus comprising:

(a) reproducing means for reproducing image data divided into a plurality of blocks from a recording medium;

(b) error detection means for detecting error data in the image data reproduced by said reproducing means;

(c) frequency detection means for detecting frequency data indicating levels of alternating component of a block including the error data, the frequency data being different from the image data;

(d) motion detection means for detecting a motion of the block including the error data; and (e) construction means for constructing image data with respect to the block including the error data according to the frequency data and an output of said motion detection means.

7. An apparatus according to claim 6, wherein said frequency detection means detects the frequency data of the block including the error data using frequency data of blocks adjacent to the block including the error data.

8. An apparatus according to claim 6, wherein said construction means comprises an intraframe construction circuit for constructing image data using image data of a frame including the error data, and an interframe construction circuit for constructing image data using image data of a frame different from the frame including the error data.

9. An apparatus according to claim 6, wherein said construction means comprises a first construction circuit for constructing image data using image data in blocks located in an oblique direction on the frame including the error data with respect to the block including the error data, a second construction circuit for constructing image data using image data in blocks located in a vertical direction on the frame including the error data with respect to the block including the error data, and a third construction circuit for constructing image data using image data in a frame different from the frame including the error data.

10. An apparatus according to claim 9, wherein said construction means further comprises a selection circuit for selectively outputting the image signals from said first, second, and third construction circuits according to the frequency data and the output of said motion detection means.

11. An image reproducing apparatus comprising:

(a) reproducing means for reproducing image data from a recording medium;

(b) error detection means for detecting error data in the image data reproduced by said reproducing means; and (c) construction means for constructing image data with respect to the error data using image data located in an oblique direction on a frame including the error data.

12. An apparatus according to claim 11, further comprising:

motion detection means for detecting a motion of the error data, wherein said construction means constructs image data on the basis of an output from said motion detection means.

13. An apparatus according to claim 11, wherein said construction means comprises an intraframe construction circuit for constructing image data using image data of a frame including the error data and an interframe constructing circuit for constructing image data using image data of a frame different from the frame including the error data.

14. An apparatus according to claim 11, wherein the image data are divided into a plurality of blocks, each of which consists of a plurality of pixels, and said construction means constructs image data using image data in blocks adjacent, in the oblique direction on the frame including the error data, to a block including the error data.

15. An apparatus according to claim 14, wherein said construction means also constructs image data using image data of blocks adjacent, in a vertical direction on the frame including the error data, to the block including the error data.

16. An image reproducing apparatus, comprising:

(a) reproducing means for reproducing image data;

(b) error detection means for detecting error data in the image data reproduced by said reproducing means; and (c) motion detection means for detecting a motion of the error data to output motion data indicating a degree of the motion of the error data by using the image data reproduced by said reproducing means and a plurality of threshold values, said motion data having multi-value.

17. An apparatus according to claim 16, wherein said motion detection means comprises subtraction means for obtaining an interframe difference between image data adjacent to the error data, said motion detection means obtaining the motion data by comparing the interframe difference and the plurality of threshold values.

* * * * *

UNITED STATES PATENT AND TRADEMARK OFFICE
CERTIFICATE OF CORRECTION

PATENT NO.  : 5,561,532

DATED       : October 1, 1996

INVENTORS   : SHINJI OHNISHI ET AL.

It is certified that error appears in the above-identified patent and that said Letters Patent is hereby corrected as shown below:

COLUMN 5

Line 65,   "block $B_{i,j+1}$" should read --block $B_{i,j}$--.

COLUMN 6

Line 8,    "block $Bi,_j$" should read --block $B_{i,j}$--;
   Line 58,   "form" should read --from--.

COLUMN 7

Line 54,   "FIG. $1o$" should read --FIG.1.--.

COLUMN 9

Line 15,   "output $\hat{2}$)" should read --output ②)--.
   Line 16,   "output $\hat{1}$)" should read --output ①)--;
   Line 18,   "output $\hat{1}$" should read --output ①--;
   Line 20,   "output $\hat{2}$" should read --output ②--;
   Line 33,   "output $\hat{2}$)" should read --output ②)--;
   Line 35,   "output $\hat{1}$)" should read --output ①)--.

COLUMN 13

Line 33,   "$X_{53}, X_{53}$," should read --$X_{53}, X_{35}$--;
   Line 63,   "circuit 80," should read --circuit 801,--.

UNITED STATES PATENT AND TRADEMARK OFFICE
CERTIFICATE OF CORRECTION

PATENT NO. : 5,561,532

DATED : October 1, 1996

INVENTORS : SHINJI OHNISHI ET AL.

It is certified that error appears in the above-identified patent and that said Letters Patent is hereby corrected as shown below:

COLUMN 14

Line 35, "(xT0," should read --($X_{70}$,--;
Line 36, "data and" should read --data $C_{16}$ and--.

Signed and Sealed this

First Day of April, 1997

BRUCE LEHMAN

Attesting Officer    Commissioner of Patents and Trademarks